United States Patent
Sumbul et al.

(10) Patent No.: US 11,195,079 B2
(45) Date of Patent: Dec. 7, 2021

(54) RECONFIGURABLE NEURO-SYNAPTIC CORES FOR SPIKING NEURAL NETWORK

(71) Applicant: INTEL CORPORATION, Santa Clara, CA (US)

(72) Inventors: Huseyin E. Sumbul, Portland, OR (US); Gregory K. Chen, Portland, OR (US); Phil Knag, Portland, OR (US); Raghavan Kumar, Hillsboro, OR (US); Ram K. Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 995 days.

(21) Appl. No.: 15/821,123

(22) Filed: Nov. 22, 2017

(65) Prior Publication Data
US 2019/0042909 A1 Feb. 7, 2019

(51) Int. Cl.
| G06N 3/04 | (2006.01) |
| G06N 3/063 | (2006.01) |
| G06N 3/08 | (2006.01) |
| G06N 3/06 | (2006.01) |

(52) U.S. Cl.
CPC ............. *G06N 3/04* (2013.01); *G06N 3/063* (2013.01); *G06N 3/08* (2013.01); *G06N 3/088* (2013.01)

(58) Field of Classification Search
CPC .......... G06N 3/04; G06N 3/049; G06N 3/063; G06N 3/088
USPC .......................................................... 706/29
See application file for complete search history.

(56) References Cited

U.S. PATENT DOCUMENTS

| 9,984,326 | B1* | 5/2018 | Chen | G06K 9/62 |
| 2007/0288410 | A1* | 12/2007 | Tomkins | G06N 3/086 706/42 |
| 2008/0243734 | A1* | 10/2008 | Deco | G06N 3/02 706/16 |
| 2014/0032464 | A1* | 1/2014 | Esser | G06N 3/04 706/26 |
| 2014/0032465 | A1* | 1/2014 | Modha | G06F 13/4068 706/27 |
| 2014/0143193 | A1* | 5/2014 | Zheng | G06N 3/049 706/25 |
| 2014/0330763 | A1* | 11/2014 | Hunt | G06N 3/049 706/42 |
| 2015/0088796 | A1* | 3/2015 | Julian | G06N 3/049 706/25 |
| 2015/0248607 | A1* | 9/2015 | Sarah | G06N 3/04 706/25 |
| 2015/0254551 | A1* | 9/2015 | Alvarez-Icaza Rivera | G06N 3/063 706/29 |

(Continued)

OTHER PUBLICATIONS

Cruz-Albrecht, Jose M., et al., "A scalable neural chip with synaptic electronics using CMOS integrated memristors," Nanotechnology, vol. 24, No. 38, 2013, 12 pages.

(Continued)

*Primary Examiner* — Ly D Pham
(74) *Attorney, Agent, or Firm* — Alliance IP, LLC

(57) ABSTRACT

In one embodiment, a processor comprises a first neuro-synaptic core comprising first circuitry to configure the first neuro-synaptic core as a neuron core responsive to a first value specified by a configuration parameter; and configure the first neuro-synaptic core as a synapse core responsive to a second value specified by the configuration parameter.

26 Claims, 17 Drawing Sheets

(56) References Cited

U.S. PATENT DOCUMENTS

| | | | |
|---|---|---|---|
| 2017/0286825 A1* | 10/2017 | Akopyan | G06N 3/049 |
| 2018/0107922 A1* | 4/2018 | Paul | G06N 20/00 |
| 2018/0174024 A1* | 6/2018 | Lin | G06N 3/063 |
| 2018/0174028 A1* | 6/2018 | Lin | G06N 3/063 |
| 2018/0174054 A1* | 6/2018 | Wild | G06N 3/049 |
| 2018/0189631 A1 | 7/2018 | Sumbul et al. | |
| 2018/0189645 A1* | 7/2018 | Chen | G06N 3/0635 |
| 2018/0189648 A1* | 7/2018 | Sengupta | G06N 3/08 |
| 2019/0042910 A1* | 2/2019 | Krishnamurthy | G06N 3/049 |
| 2019/0286969 A1* | 9/2019 | Wang | G06N 3/049 |

OTHER PUBLICATIONS

Merolla, P. A., et al., "A million spiking-neuron integrated circuit with a scalable communication network and interface," Science, vol. 345, No. 6197, sciencemag.org, pp. 668-673, Aug. 8, 2014.

* cited by examiner

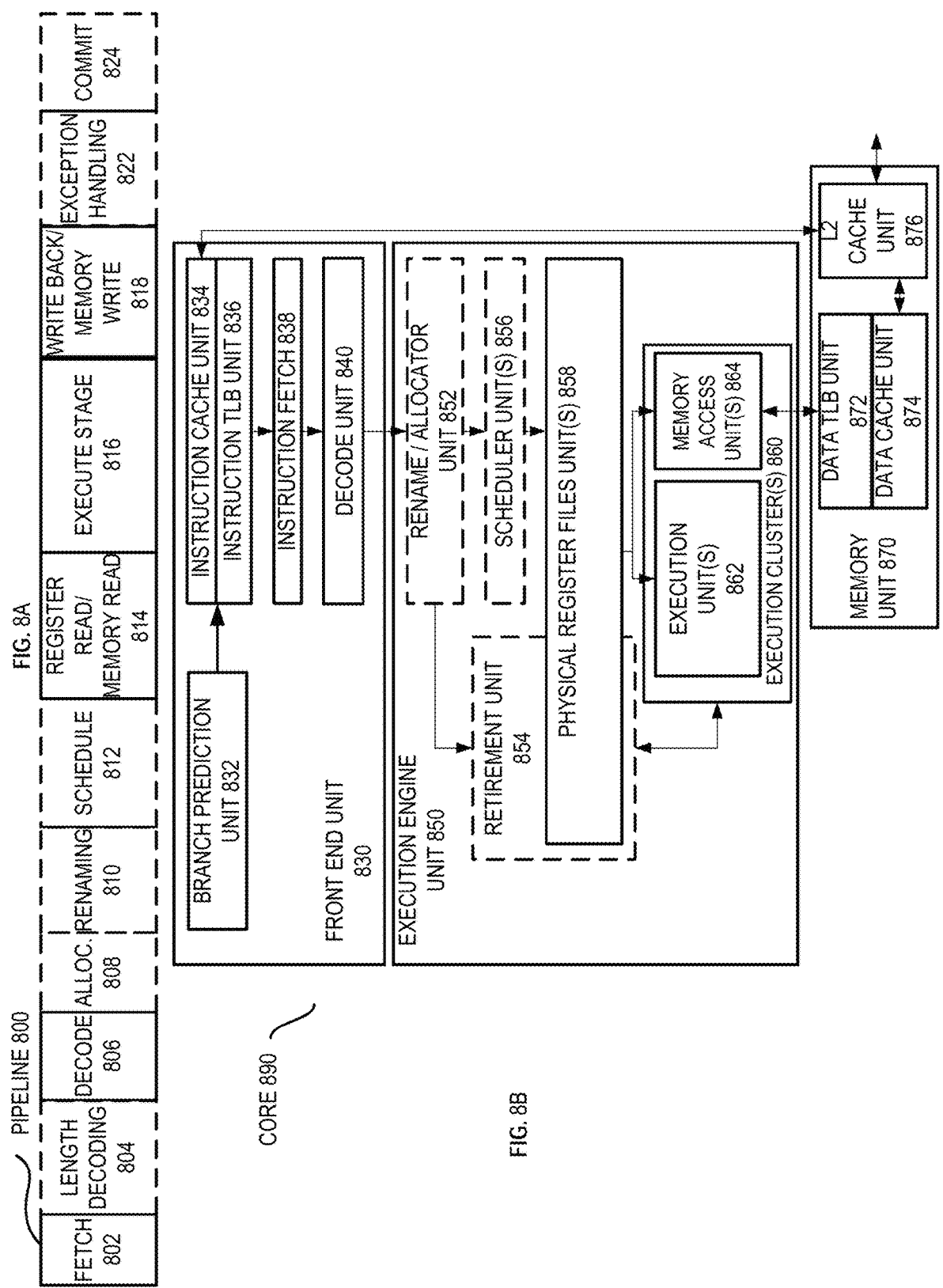

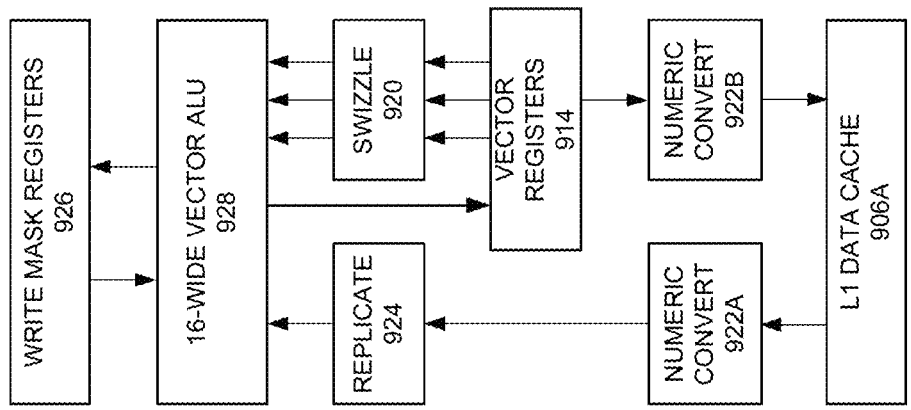
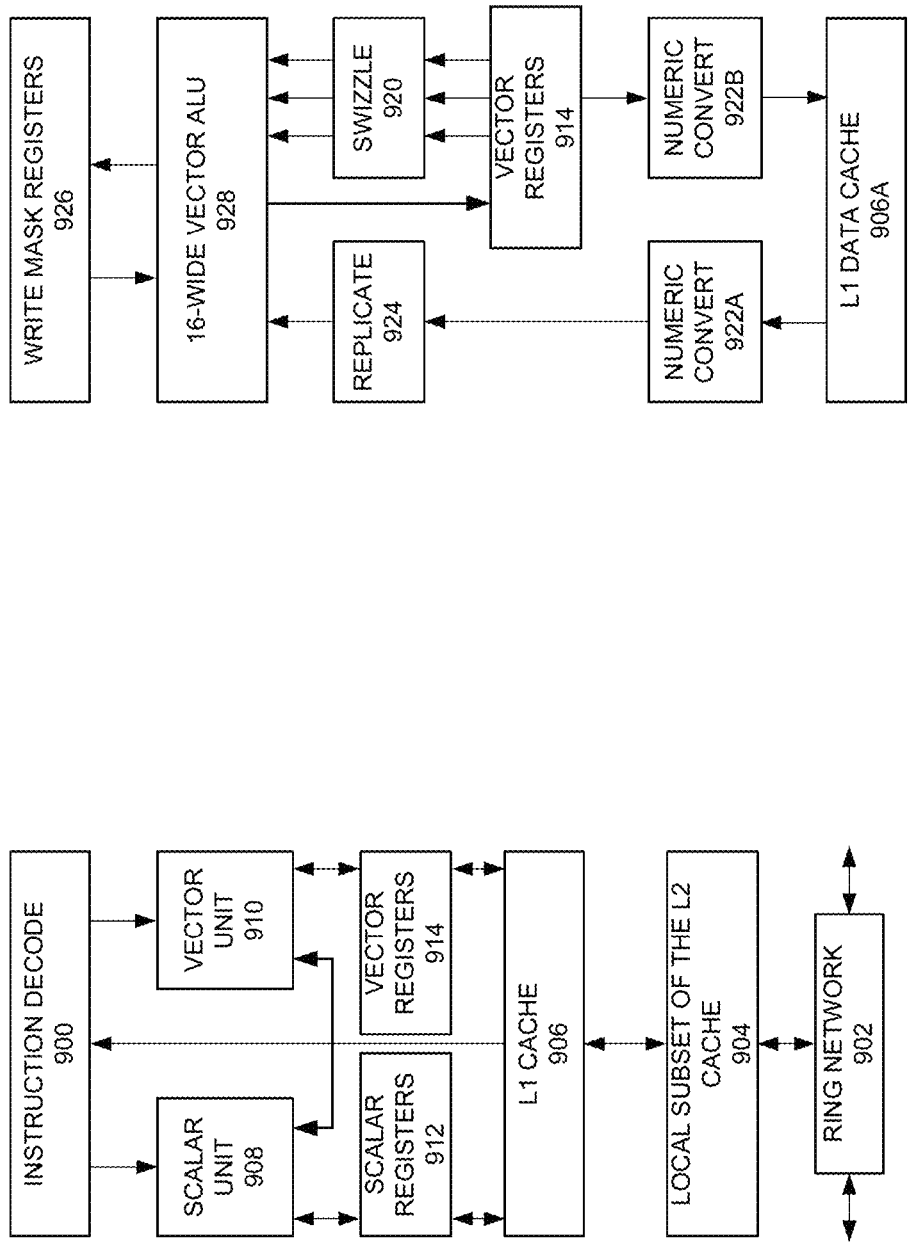

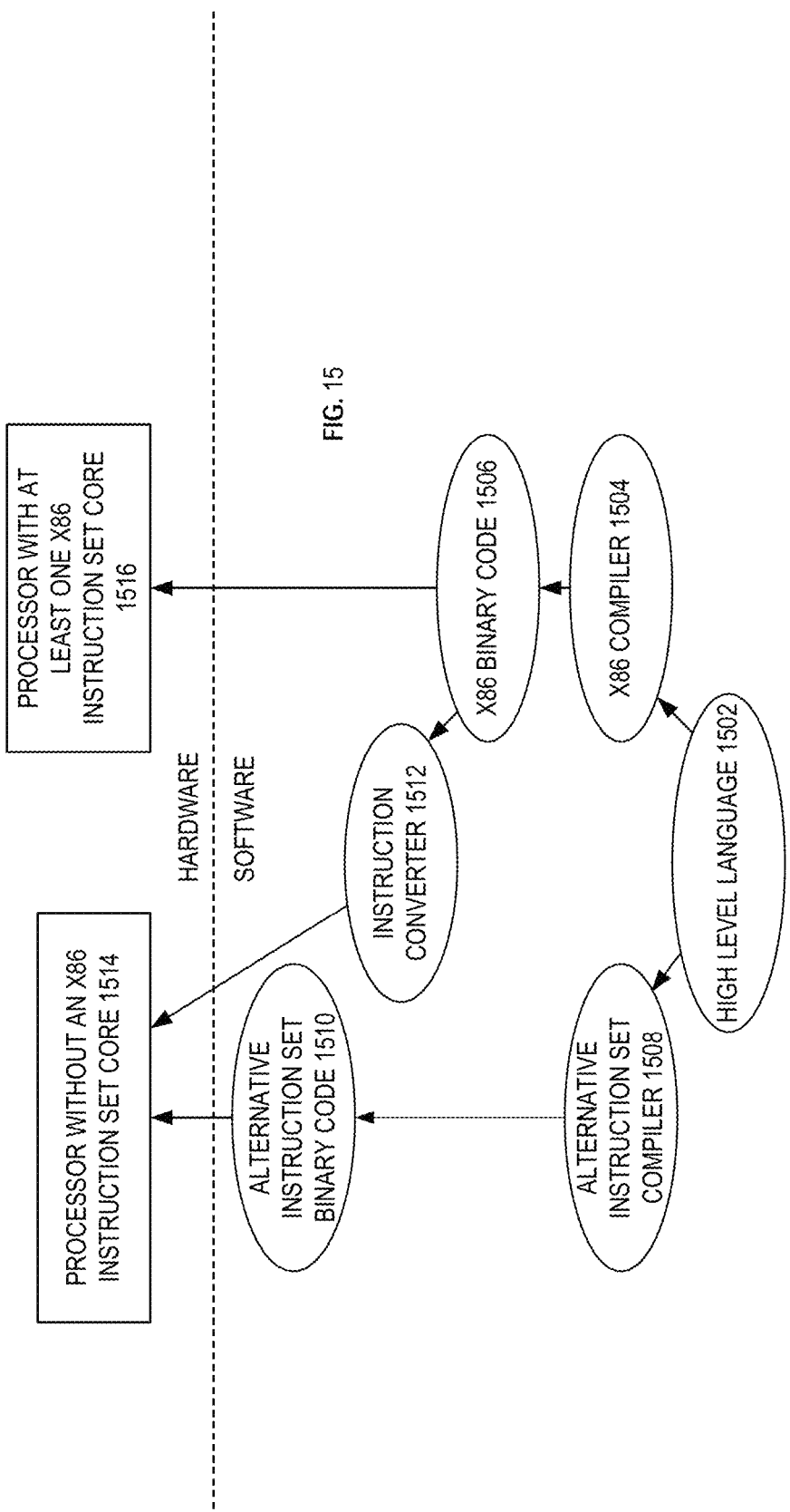

RECONFIGURABLE NEURO-SYNAPTIC CORES FOR SPIKING NEURAL NETWORK

FIELD

The present disclosure relates in general to the field of computer development, and more specifically, to spiking neural networks.

BACKGROUND

A neural network may include a group of neurons loosely modeled after the structure of a biological brain which includes large clusters of neurons connected by synapses. In a neural network, neurons are connected to other neurons via links which may be excitatory or inhibitory in their effect on the activation state of connected neurons. A neuron may perform a function utilizing the values of its inputs to update a membrane potential of the neuron. A neuron may propagate a spike signal to connected neurons when a threshold associated with the neuron is surpassed. A neural network may be trained or otherwise adapted to perform various data processing tasks, such as computer vision tasks, speech recognition tasks, data classification tasks, or other suitable computing tasks.

BRIEF DESCRIPTION OF THE DRAWINGS

FIG. 8A is a block diagram illustrating both an exemplary in-order pipeline and an exemplary register renaming, out-of-order issue/execution pipeline in accordance with certain embodiments;

FIG. 8B is a block diagram illustrating both an exemplary embodiment of an in-order architecture core and an exemplary register renaming, out-of-order issue/execution architecture core to be included in a processor in accordance with certain embodiments;

FIGS. 9A-B illustrate a block diagram of a more specific exemplary in-order core architecture, which core would be one of several logic blocks (potentially including other cores of the same type and/or different types) in a chip in accordance with certain embodiments;

FIG. 15 is a block diagram contrasting the use of a software instruction converter to convert binary instructions in a source instruction set to binary instructions in a target instruction set in accordance with certain embodiments.

Like reference numbers and designations in the various drawings indicate like elements.

DETAILED DESCRIPTION

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operations, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to specific integrated circuits, such as computing platforms or microprocessors, other embodiments are applicable to other types of integrated circuits and logic devices. Similar techniques and teachings of embodiments described herein may be applied to other types of circuits or semiconductor devices. For example, the disclosed embodiments may be used in various devices, such as server computer systems, desktop computer systems, handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency.

Figure 1:
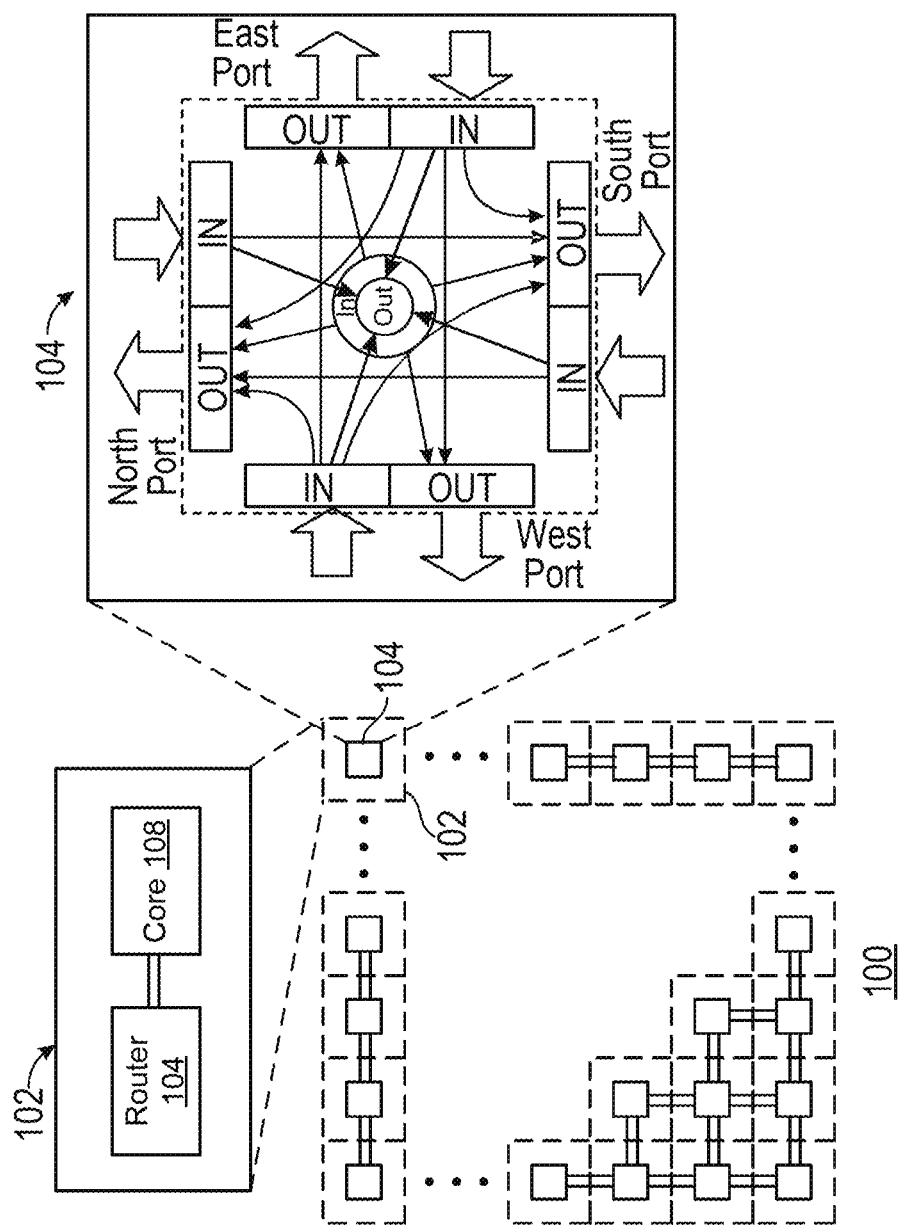
FIG. 1 illustrates a block diagram of a processor comprising a network on a chip (NoC) system that may implement a neural network in accordance with certain embodiments.

FIG. 1 illustrates a block diagram of a processor 100 comprising a network on a chip (NoC) system that may implement a neural network in accordance with certain embodiments. The processor 100 may include any processor or processing device, such as a microprocessor, an embedded processor, a digital signal processor (DSP), a network processor, a handheld processor, an application processor, a co-processor, an SoC, or other device to execute code. In a particular embodiment, processor 100 is implemented on a single die.

In the embodiment depicted, processor 100 includes a plurality of network elements 102 arranged in a grid network and coupled to each other with bi-directional links. However, an NoC in accordance with various embodiments of the present disclosure may be applied to any suitable network topologies (e.g., a hierarchical network or a ring network), sizes, bus widths, and processes. In the embodiment depicted, each network element 102 includes a router 104 and a core 108 (which in some embodiments may be a neuro-synaptic core block that implements neurons and/or synapses of a neural network), however in other embodiments, multiple cores from different network elements 102 may share a single router 104. The routers 104 may be communicatively linked with one another in a network, such as a packet-switched network and/or a circuit-switched network, thus enabling communication between components (such as cores, storage elements, or other logic blocks) of the NoC that are connected to the routers. In the embodiment depicted, each router 104 is communicatively coupled to its own core 108. In various embodiments, each router 104 may be communicatively coupled to multiple cores 108 (or other processing elements or logic blocks). As used herein, a reference to a core may also apply to other embodiments where a different logic block is used in place of a core. For example, various logic blocks may comprise a hardware accelerator (e.g., a graphics accelerator, multi-media accelerator, or video encode/decode accelerator), I/O block, memory controller, or other suitable fixed function logic. The processor 100 may include any number of processing elements or other logic blocks that may be symmetric or asymmetric. For example, the cores 108 of processor 100 may include asymmetric cores or symmetric cores. Processor 100 may include logic to operate as either or both of a packet-switched network and a circuit-switched network to provide intra-die communication.

In particular embodiments, packets may be communicated among the various routers 104 using resources of a packet-switched network. That is, the packet-switched network may provide communication between the routers (and their associated cores). The packets may include a control portion and a data portion. The control portion may include a destination address of the packet, and the data portion may contain the specific data to be communicated on the processor 100. For example, the control portion may include a destination address that corresponds to one of the network elements or cores of the die. In some embodiments, the packet-switched network includes buffering logic because a dedicated path is not assured from a source to a destination, and a packet may need to be stopped temporarily if two or more packets need to traverse the same link or interconnect. As an example, the packets may be buffered (e.g., by flip flops) at each of the respective routers as the packet travels from a source to a destination. In other embodiments, the buffering logic may be omitted and packets may be dropped when collision occurs. The packets may be received, transmitted, and processed by the routers 104. The packet-switched network may use point-to-point communication between neighboring routers. The control portions of the packets may be transferred between routers based on a packet clock, such as a 4 GHz clock. The data portion of the packets may be transferred between routers based on a similar clock, such as a 4 GHz clock.

In an embodiment, routers of processor 100 may be variously provided in two networks or communicate in two networks, such as a packet-switched network and a circuit-switched network. Such a communication approach may be termed a hybrid packet/circuit-switched network. In such embodiments, packets may be variously communicated among the various routers 104 using resources of the packet-switched network and the circuit-switched network. In order to transmit a single data packet, the circuit-switched network may allocate an entire path, whereas the packet-switched network may allocate only a single segment (or interconnect). In some embodiments, the packet-switched network may be utilized to reserve resources of the circuit-switched network for transmission of data between routers 104.

Router 104 may include a plurality of port sets to variously couple to and communicate with adjoining network elements 102. For example, circuit-switched and/or packet-switched signals may be communicated through these port sets. Port sets of router 104 may be logically divided, for example, according to the direction of adjoining network elements and/or the direction of traffic exchanges with such elements. For example, router 104 may include a north port set with input ("IN") and output ("OUT") ports configured to (respectively) receive communications from and send communications to a network element 102 located in a "north" direction with respect to router 104. Additionally or alternatively, router 104 may include similar port sets to interface with network elements located to the south, west, east, or other direction. In the embodiment depicted, router 104 is configured for X first, Y second routing wherein data moves first in the East/West direction and then in the North/South direction. In other embodiments, any suitable routing scheme may be used.

In various embodiments, router 104 further comprises another port set comprising an input port and an output port configured to receive and send (respectively) communications from and to another agent of the network. In the embodiment depicted, this port set is shown at the center of router 104. In one embodiment, these ports are for communications with logic that is adjacent to, is in communication with, or is otherwise associated with router 104, such as logic of a "local" core 108. Herein, this port set will be referred to as a "core port set," though it may interface with logic other than a core in some implementations. In various embodiments, the core port set may interface with multiple cores (e.g., when multiple cores share a single router) or the router 104 may include multiple core port sets that each interface with a respective core. In another embodiment, this port set is for communications with a network element which is in a next level of a network hierarchy higher than that of router 104. In one embodiment, the east and west directional links are on one metal layer, the north and south directional links on a second metal layer, and the core links on a third metal layer. In an embodiment, router 104 includes crossbar switching and arbitration logic to provide the paths of inter-port communication such as that shown in FIG. 1. Logic (such as core 108) in each network element may have a unique clock and/or voltage or may share a clock and/or voltage with one or more other components of the NoC.

In particular embodiments, a core 108 of a network element may comprise a neuro-synaptic core block (e.g., comprising one or more neuro-synaptic cores) to implement one or more neurons and/or one or more synapses. A processor may include one or more neuro-synaptic cores. In various embodiments, each neuro-synaptic core may comprise one or more computational logic blocks that are time-multiplexed across neurons and/or synapses of the neuro-synaptic core. A computational logic block may be operable to perform various calculations for a neuron, such as updating the membrane potential of the neuron, determining whether the membrane potential exceeds a threshold, and/or other operations associated with a neuron. Herein, reference to a neuron may refer to logic (e.g., circuitry) used to implement a neuron of a neural network. Such logic may include storage for one or more parameters associated with the neuron. In some embodiments, the logic used to implement a neuron may overlap with the logic used to implement one or more other neurons (in some embodiments a neuron corresponding to a neuron may share computational logic with other neurons corresponding to other neurons and control signals may determine which neuron is currently using the logic for processing).

Figure 2:
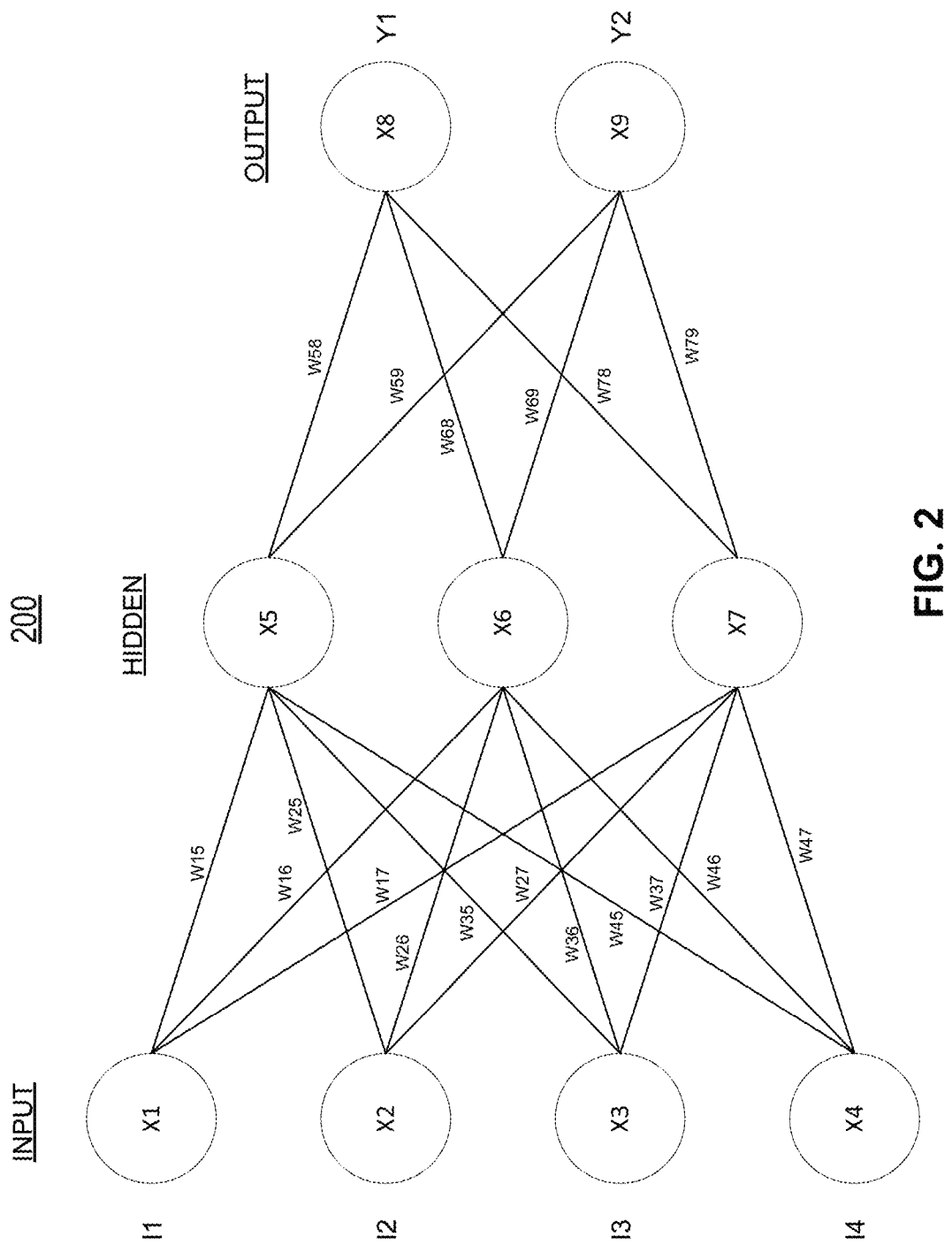
FIG. 2 illustrates an example portion of a neural network in accordance with certain embodiments.

FIG. 2 illustrates an example portion of a neural network 200 in accordance with certain embodiments. The neural network 200 includes neurons X1-X9. Neurons X1-X4 are input neurons that respectively receive primary inputs I1-I4 (which may be held constant while the neural network 200 processes an output). Any suitable primary inputs may be used. As one example, when neural network 200 performs image processing, a primary input value may be the value of a pixel from an image (and the value of the primary input may stay constant while the image is processed). As another example, when neural network 200 performs speech processing, the primary input value applied to a particular input neuron may change over time based on changes to the input speech.

While a specific topology and connectivity scheme is shown in FIG. 2, the teachings of the present disclosure may be used in neural networks having any suitable topology and/or connectivity. For example, a neural network may be a feedforward neural network, a recurrent network, a convolutional neural network, or other neural network with any suitable connectivity between neurons. In the embodiment depicted, each link between two neurons has a synapse weight indicating the strength of the relationship between the two neurons. The synapse weights are depicted as WXY, where X indicates the pre-synaptic neuron and Y indicates the post-synaptic neuron. Links between the neurons may be excitatory or inhibitory in their effect on the activation state of connected neurons. For example, a spike that propagates from X1 to X5 may increase or decrease the membrane potential of X5 depending on the value of W15. In various embodiments, the connections may be directed or undirected.

In general, during each time-step of a neural network, a neuron may receive any suitable inputs, such as a bias value or one or more input spikes from one or more of the neurons that are connected via respective synapses to the neuron (this set of neurons are referred to as fan-in neurons of the neuron). The bias value applied to a neuron may be a function of a primary input applied to an input neuron and/or some other value applied to a neuron (e.g., a constant value that may be adjusted during training or other operation of the neural network). In various embodiments, each neuron may be associated with its own bias value, or a bias value could be applied to multiple neurons.

The neuron may perform a function utilizing the values of its inputs and its current membrane potential. For example, the inputs may be added to the current membrane potential of the neuron to generate an updated membrane potential. As another example, a non-linear function, such as a sigmoid transfer function, may be applied to the inputs and the current membrane potential. Any other suitable function may be used. The neuron then updates its membrane potential based on the output of the function. When the membrane potential of a neuron exceeds a threshold, the neuron may send spikes to each of its fan-out neurons (i.e., the neurons connected to the output of the spiking neuron). For example, when X1 spikes, the spikes may be propagated to X5, X6, and X7. As another example, when X5 spikes, the spikes may be propagated to X8 and X9 (and in some embodiments to X1, X2, X3, and X4). In various embodiments, when a neuron spikes, the spike may be propagated to one or more connected neurons residing on the same neuro-synaptic core block and/or packetized and transferred through one or more routers 104 to a neuro-synaptic core block that includes one or more of the spiking neuron's fan-out neurons. The neurons that a spike is sent to when a particular neuron spikes are referred to as the neuron's fan-out neurons while the neurons that may send spikes to a particular neuron are referred to as the neuron's fan-in neurons.

In a particular embodiment, one or more memory arrays may comprise memory cells that store the synapse weights, membrane potentials, thresholds, outputs (e.g., the number of times that a neuron has spiked), bias amounts, or other values used during operation of the neural network 200. The number of bits used for each of these values may vary depending on the implementation. In the examples illustrated below, specific bit lengths may be described with respect to particular values, but in other embodiments, any suitable bit lengths may be used. Any suitable volatile and/or non-volatile memory may be used to implement the memory arrays.

Spiking neuromorphic computers may be constructed by tiling modular neuron cores and synapse cores on an interconnected network, where synapse cores store and process synapse weights, and neuron cores store neuron membrane potentials and generate spikes (in some embodiments, neuron cores may also perform weight integration). Studies suggest that biological neural nets in mammal brains typically have billions of neurons, with a neuron having fan-out connections with up to roughly 10,000 neurons (with synapses for each connection). To mimic this high fan-out behavior in a spiking neural network (SNN), SNN hardware may include a large synaptic array (e.g., a static random access memory (SRAM)) for storing synapse weights. Depending on the implementation, the ratio between a neuron and its connected synapses may be roughly 1:1,000. For instance, for supporting sparsely or densely connected spiking networks such as feedforward and recurrent neural networks, or restricted/non-restricted Boltzmann Machine type networks, SNN hardware may support a neuron-to-synapse ratio of 1:1024. Such a network may be termed a "synapse-heavy" network.

As one example of a synapse-heavy network, a spiking Liquid State Machine (LSM) network may process and classify 28×28 pixels of Modified National Institute of Standards and Technology (MNIST) digits, where each pixel is mapped to a neuron. Such network may be constructed with 28×28=784 neurons on a visible layer and 512 neurons in a hidden reservoir layer. With an example sparsity of 25% of connectivity, the network would utilize 0.25×(784×512+512×512)=165,888 synapses, resulting in a neuron-to-synapse ratio of 1:212 for this network.

On the other hand, a state-of-the art deep learning or convolutional neural network (CNN) used, e.g., for visual processing, typically utilizes an opposite number of hardware resources, that is, a large number of neurons to process and store image/video pixels and activation maps (also referred to as convolved features or feature maps) and relatively few shared synapse weights to store features (also referred to as filters, kernels, or feature detectors) for the convolution operation. Such a network may be termed a "neuron-heavy" network.

For example, neuro-synaptic hardware targeted for a spiking deep CNN may utilize shared synapse weights that store a number of features to be extracted on the input image by being strided and convolved over the image patch. Each pixel of the input image is then mapped to individual neurons that perform activation. As an example, a spiking deep CNN network with 64 features of size 8×8 with a stride of 2 on the first convolution layer may process and classify a red green blue (RGB) image of 256×256 pixels. This example network may generate 64×125×125×3 activation maps using 64×8×8×3 feature weights (i.e., synapse weights of the features). In a spiking neuromorphic computer, such a network would be mapped to 64×125×125=1,000,000 neurons storing and performing the activations and 64×8×8×3=12,288 synapses storing the feature weights to be convolved over the image. In this example, the neural network has a neuron-to-synapse ratio of approximately 81:1.

Various embodiments of the present disclosure allow a neuromorphic processor to efficiently support different types of neural networks with opposing resource requirements by providing reconfigurable resources to perform as neurons or synapses depending on the target network type. For example, a digital SNN neuromorphic processor may include reconfigurable neuro-synaptic cores. In some embodiments, the reconfigurable neuro-synaptic cores are arranged in neuro-synaptic core blocks. Each neuro-synaptic core block may include one or more first neuro-synaptic cores and/or one or more second neuro-synaptic cores. In one configuration, a first neuro-synaptic core of a neuro-synaptic core block is configured as a neuron core and a second neuro-synaptic core of a neuro-synaptic core block is configured as a synapse core. In a second configuration, the first neuro-synaptic core is configured as a synapse core and the second neuro-synaptic core is configured as a neuron core. In a particular embodiment, the first neuro-synaptic cores each include a fast-access small memory array and the second neuro-synaptic cores each include a high-density large memory array that includes more storage space than the small memory array. In a particular embodiment, the small array is a Register File (RF) and the large array is a static random access memory (SRAM).

For a synapse-heavy network, the neuro-synaptic core with the small memory array may be assigned as the neuron core to generate spikes, store, and update neuron membrane potentials, and the neuro-synaptic core with the large memory array may be assigned as the synapse core to store synapse weights, and perform synaptic tasks such as weight update if online learning is performed. Conversely, for a neuron-heavy network type, the neuro-synaptic core with the small memory array may be assigned as the synapse core and the neuro-synaptic core with the large memory array may be assigned as the neuron core. In one embodiment in which the implemented network is a CNN, the synapse core may store shared weights for features in the small array and the neuron core with the large memory array may store and generate partial sums for neuron activations. Various embodiments of the present disclosure may improve the efficiency of a neuromorphic processor by allowing synapse-heavy neural networks (e.g., feed-forward) and neuron-heavy neural networks (e.g., CNNs) to be mapped onto the same processor hardware.

In another embodiment, two neuro-synaptic cores of a neuro-synaptic core block may share a single large memory array, such as an SRAM, which may be partitioned into a first section to store neuron related information and a second section to store synapse weights. Each section may be identified via appropriate address pointers or row-offsets.

Various embodiments of the present disclosure may provide a neuromorphic processor that may be used with any suitable neural network and working mechanisms, such as (but not limited to) on-line biologically plausible learning rules, sparse connectivity, temporal coding, excitatory-inhibitory networks, configurable weight precision, reward modulation, directed and un-directed network connections, forward and backward sent spikes, and other working mechanisms by implementing the dedicated logic in the appropriate neuro-synaptic cores.

Figure 3A:
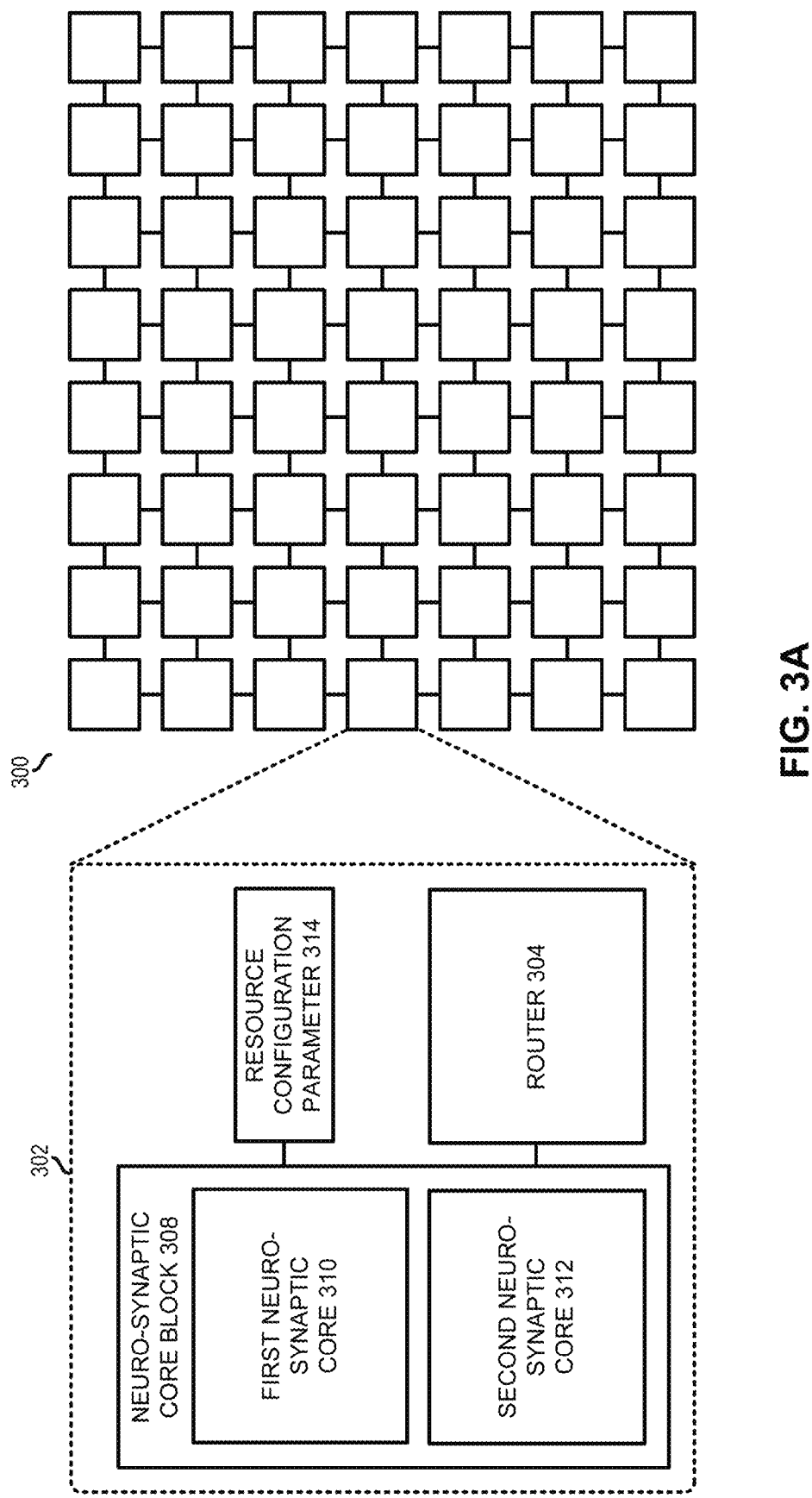
FIG. 3A illustrates a neuromorphic processor including a system of reconfigurable neuro-synaptic core blocks in accordance with certain embodiments.

FIG. 3A illustrates a neuromorphic processor 300 including a system of reconfigurable neuro-synaptic core blocks 308 in accordance with certain embodiments. Processor 300 includes a plurality of network elements 302 arranged in an NoC, wherein the network elements 302 each include a neuro-synaptic core block 308 connected to a router 304. In other embodiments, each router 304 may be connected to any number of neuro-synaptic core blocks 308 in a network element 302 to minimize network resources. Routers 304 of the various network elements 302 may allow neuro-synaptic cores to communicate with each other. In various embodiments, network elements 302 may have any suitable characteristics of network elements 102, routers 304 may have any suitable characteristics of routers 104, and neuro-synaptic cores or core blocks 308 may have any suitable characteristics of cores 108. In a particular embodiment, the neuro-synaptic cores and/or core blocks are modular and may (along with their associated routers 304) be tiled across processor 300.

A neuro-synaptic core block 308 includes one or more neuro-synaptic cores that each include logic (e.g., circuitry and other supporting logic) to function as either a neuron core or a synapse core. For example, in the embodiment depicted, neuro-synaptic core block 308 includes a first neuro-synaptic core 310 and a second neuro-synaptic core 312. In another embodiment, neuro-synaptic core block 308 may include a single first neuro-synaptic core 310. In yet another embodiment, neuro-synaptic core block 308 may include a single second neuro-synaptic core 312. In yet another embodiment, neuro-synaptic core block 308 may include a plurality of first neuro-synaptic cores 310 and/or a plurality of second neuro-synaptic cores 312

In a particular embodiment, communications between a first neuro-synaptic core 310 of a neuro-synaptic core block 308 and a second neuro-synaptic core 312 of the core block 308 may pass through router 304 (thus each neuro-synaptic core may interface with an input and output port of the router 304). In another embodiment, the neuro-synaptic cores may be hardwired together using a dedicated channel for communications between the neuro-synaptic cores such that communications between the neuro-synaptic cores of a neuro-synaptic core block do not pass through router 304. Each neuro-synaptic core may communicate with other neuro-synaptic cores across the processor via router 304 (and other routers if the target neuro-synaptic core is in a different network element 302). In various embodiments, the neuro-synaptic cores may share or use other available resources in other neuro-synaptic core blocks on the NoC. Various other embodiments may implement any suitable communication options.

When a neuro-synaptic core of core block 308 is configured as a neuron core, it may implement a plurality of neurons and when a neuro-synaptic core is configured as a synapse core, it may implement a plurality of synapses. Connectivity of the neurons and synapses of the various neuro-synaptic cores of the system can be achieved by implementing one or more look-up-tables, pointer based connections, a mathematical mapping function, or other suitable connectivity scheme. Inputs and neuron-to-neuron communication spikes may be broadcast, multicast, or unicast depending on the NoC architecture and its routing scheme(s), and various embodiments of the neuromorphic processor 300 are compatible with any of these communication methods.

The neuro-synaptic core block 308 (and/or individual neuro-synaptic cores) may also be associated with a resource configuration parameter 314. In a particular embodiment, parameter 314 may be implemented as a binary indication (e.g., via a single bit). In an embodiment, parameter 314 is set offline by a user or other entity based on the desired configuration and it remains constant during the runtime of the processor 300 (i.e., while the neural network is operated), though the disclosure is not necessarily limited thereto. In various embodiments, resource configuration parameter 314 is a global setting that has a uniform value across all of the core blocks 308 and/or neuro-synaptic cores of the processor. In other embodiments, configuration parameter 314 may be different for different neuro-synaptic cores, depending on the resources utilized for the implemented neural network. In a particular embodiment, resource configuration parameter 314 is mutually exclusive for the two neuro-synaptic cores of a given core block 308. That is, for a first value of the parameter 314, the first neuro-synaptic core 310 is configured as a neuron core and the second neuro-synaptic core 312 is configured as a synapse core and for a second value of the parameter 314, the second neuro-synaptic core 312 is configured as a neuron core and the first neuro-synaptic core 310 is configured as a synapse core. In a particular embodiment, this condition may be guaranteed by generating a configuration signal for the first neuro-synaptic core by buffering the resource configuration parameter 314, and generating a configuration signal for the second neuro-synaptic core by inverting the configuration signal for the first neuro-synaptic core and providing the inverted signal to the second neuro-synaptic core. In various embodiments, using a global configuration setting with mutual exclusivity preserves both neuron and synapse processing capabilities of the cores and top-level addressing.

Figure 3B:
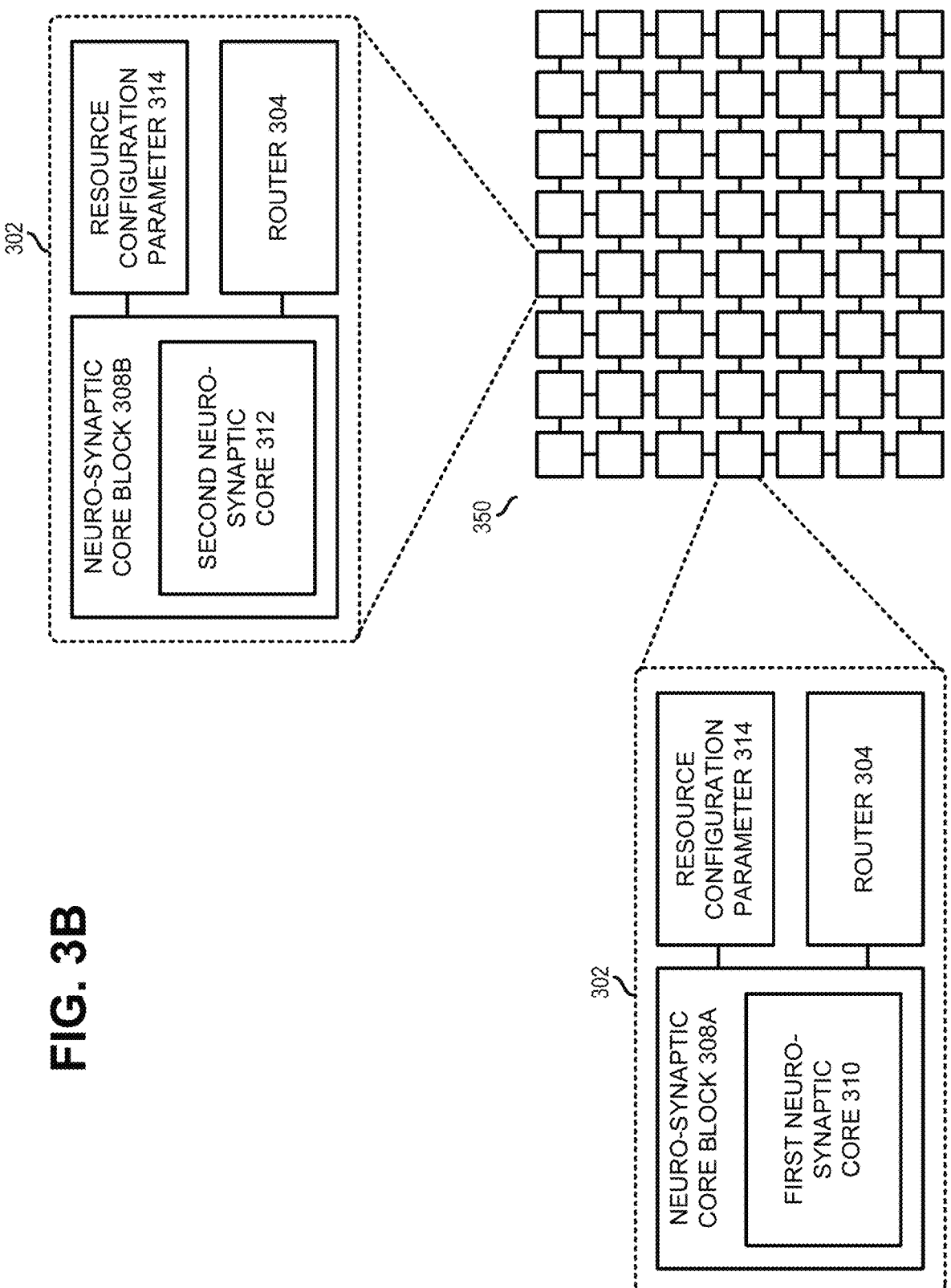
FIG. 3B illustrates a second neuromorphic processor including a system of reconfigurable neuro-synaptic core blocks in accordance with certain embodiments.

FIG. 3B illustrates a second neuromorphic processor 350 including a system of reconfigurable neuro-synaptic core blocks 308A and 308B in accordance with certain embodiments. Neuro-synaptic core blocks 308A and 308B may have any suitable characteristics of neuro-synaptic core block 308. Neuro-synaptic core block 308A includes a single first neuro-synaptic core 310 and neuro-synaptic core block 308B includes a single second neuro-synaptic core 312. Any suitable number of network elements 302 may each include a neuro-synaptic core block 308A and any suitable number of network elements 302 may each include a neuro-synaptic core block 308B. In various embodiments, a processor may include any suitable number of first neuro-synaptic cores 310 and second neuro-synaptic cores 312. In a particular embodiment, resource configuration parameter 314 is provided to each of the first neuro-synaptic cores 310 and each of the second neuro-synaptic cores 312. In other embodiments, configuration parameter 314 may be different for different neuro-synaptic cores (e.g., each neuro-synaptic core 310 or 312 may receive its own configuration parameter 314 such that the neuro-synaptic cores may be individually configured).

Figure 4:
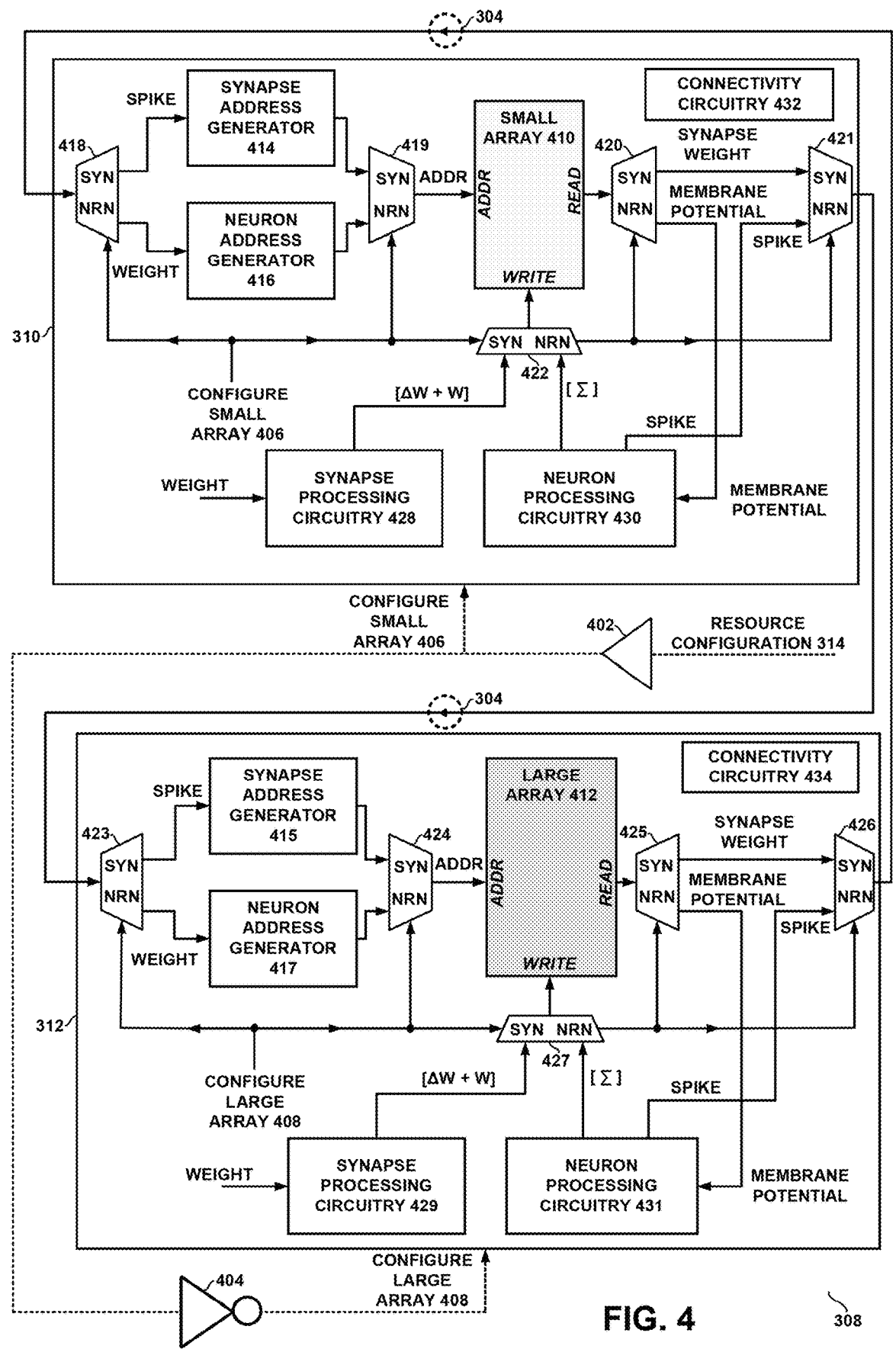
FIG. 4 illustrates a neuro-synaptic core block with reconfigurable neuro-synaptic cores.

FIG. 4 illustrates a neuro-synaptic core block 308 with reconfigurable neuro-synaptic cores 310 and 312. In the embodiment depicted, neuro-synaptic core 310 includes a small memory array 410 and neuro-synaptic core 312 includes a large memory array 412, which is larger than the small array 410. In other embodiments, any suitably sized memory arrays may be used within each neuro-synaptic core or one or more neuro-synaptic cores may share one or more memory arrays. In general, when a neural network is synapse-heavy, the neuro-synaptic cores with the larger arrays may be assigned as synapse cores and the neuro-synaptic cores with the smaller arrays may be assigned as neuron cores (this configuration may be referred to as a synapse-heavy mode). In contrast, when a neural network is neuron-heavy, the neuro-synaptic cores with the larger arrays may be assigned as neuron cores and the neuro-synaptic cores with the smaller arrays may be assigned as synapse cores (this configuration may be referred to as a neuron-heavy mode). The resource configuration parameter 314 may specify whether the core block 308 is to be used in the neuron-heavy mode or in the synapse-heavy mode.

In particular embodiments, the neuron-heavy mode may be selected when the processor 300 is to implement a weight-sharing spiking neural network, in which synapse weights may be shared among different pairs of neurons. One example of a weight-sharing spiking neural network is a CNN, in which feature weights may be shared to generate different activation maps from the same input layer. In various embodiments, the synapse-heavy mode may be selected when the processor 300 is to implement a non-weight-sharing spiking neural network in which synapse weights are not shared among different pairs of neurons. For example, in many feedforward or recurrent networks, each connected pair of neurons includes its own synapse weight. In various embodiments, any suitable neural network may be implemented through the neuron-heavy and synapse-heavy modes.

In various embodiments, both neuro-synaptic cores of the core block 308 are built in an in-memory processing fashion where the memory at the center of each neuro-synaptic core is tightly integrated and wrapped with dedicated circuitry. Dedicated neuron and synapse circuitry for neuron-heavy and synapse-heavy operations are built around the memory arrays, and are selectively activated based on the configure small array signal 406 and configure large array signal 408 which are derived from the resource configuration parameter 314 (e.g., parameter 314 may be buffered via buffer 402 to produce the signal 406 and parameter 314 may be inverted via inverter 404 to produce signal 408). When particular circuitry is activated in a neuro-synaptic core, it may take control of the memory array of the neuro-synaptic core and handle all the synapse or neuron operations while the unused circuitry is deactivated and power gated by the respective signal 406 or 408 to minimize leakage.

For example, in the depicted embodiment, the first neuro-synaptic core 310 includes various circuitry blocks including synapse address generator 414, neuron address generator 416, synapse processing circuitry 428, and neuron processing circuitry 430 that may be selectively activated based on the value of the resource configuration parameter 314 (e.g., via configure small array signal 406) and the second neuro-synaptic core 312 includes various circuitry blocks including synapse address generator 415, neuron address generator 417, synapse processing circuitry 429, and neuron processing circuitry 431 that may be selectively activated based on the value of resource configuration parameter 314 (e.g., via configure large array signal 408). Output signals of the activated circuitry blocks may be controlled by mux and demux blocks 418-427, which are also controlled by resource configuration parameter 314 (e.g., via configure small array signal 406 and configure large array signal 408).

As described above, a neuro-synaptic core block 308 may include circuitry to access a configuration parameter (e.g., resource configuration parameter 314, a derivative thereof, or other configuration parameter, such as a configuration parameter that is assigned solely to the particular neuro-synaptic core block 308). The circuitry may also configure a neuro-synaptic core (e.g., 310 or 312 as a neuron core when the configuration parameter specifies a first value and configure the neuro-synaptic core as a synapse core when the configuration parameter specifies a second value. This configuration circuitry may include any suitable circuitry (e.g., circuit traces, multiplexers, demultiplexers, or other selection circuitry that can selectively enable and disable circuitry based on the value of the configuration parameter). In at least one embodiment, configuration of a neuro-synaptic core (e.g., 310 or 312) as a neuron core may include one or more of enabling a neuron address generator (e.g., 416 or 417) and neuron processing circuitry (e.g., 430 or 431) of the core and disabling synapse address generator (e.g., 414 or 415) and synapse processing circuitry (e.g., 428 or 429). In at least one embodiment, configuration of a neuro-synaptic core (e.g., 310 or 312) as a synapse core may include one or more of disabling a neuron address generator (e.g., 416 or 417) and neuron processing circuitry (e.g., 430 or 431) of the core and enabling synapse address generator (e.g., 414 or 415) and synapse processing circuitry (e.g., 428 or 429).

Neuron processing circuitry 430 and neuron processing circuitry 431 may perform any suitable operations with respect to neurons of the core block 308. For example, such operations may include updating the states of neurons, updating membrane potentials, learning operations, generating spikes, other operations described herein, and/or other suitable operations. When a neuro-synaptic core 310 or 312 is configured as a neuron core, the array of the neuro-synaptic core may be used to store membrane potentials and neuron states. Any suitable neuron states may be stored for a neuron, such as whether the neuron is in a refractory period, how many timesteps remain in a refractory period, spike timing information for online learning, bias information, leakage information, a spike rate of the neuron, and/or other suitable state information.

In various embodiments, neuron processing circuitry 430 may be symmetrical with or asymmetrical with neuron processing circuitry 431. For example, in a particular embodiment, neuron processing circuitry 430 may perform the same set of operations as neuron processing circuitry 431. In another embodiment, neuron processing circuitry 430 and neuron processing circuitry 431 may each perform a unique set of operations (e.g., adapted to different target neural networks). Similarly, synapse processing circuitry 428 and synapse processing circuitry 429 may be symmetrical or asymmetrical. In various embodiments, the processor may include a plurality of first neuro-synaptic cores that each include the circuit blocks depicted in 310 as well as a plurality of second neuro-synaptic cores that each include the circuit blocks depicted in 312.

In a particular embodiment, the neuron states and the membrane potentials are stored compactly in a single bank of an array (e.g., a single register file or SRAM). In another embodiment, the membrane potentials are stored in a first bank of an array and the neuron states are stored in a second bank of the array to reduce energy usage and increase performance (at a potential cost of larger memory array area).

In a particular embodiment, the small array 410 is a register file (e.g., built from bit cells). For example, the small array 410 may be a register file providing low energy consumption for read and write operations for its small size, that includes a write port and a read port that may be operated simultaneously for fast multi-port access. In another embodiment, the small array 410 is an SRAM. In other embodiments, small array 410 may include any other suitable random access memory structure, such as an array of flip flops.

In a particular embodiment, the large array 412 is an SRAM. For example, the large array 412 may be an SRAM that includes a single port that is used for reading and writing for high-density and low area impact. In other embodiments, large array 412 may include any other suitable random access memory structure, such as a register file or an embedded DRAM.

In various embodiments, (e.g., based on target frequency, energy, and area specifications of the hardware), the small arrays 410 and/or the large arrays 412 may be built in single instances or with parallel partition banks and may have any suitable number of read and write ports.

In an alternative embodiment, a single large memory (e.g., an SRAM) can be partitioned dynamically to allocate memory space for both the small array 410 and the large array 412 with address pointers or row-offsets. In a particular embodiment, the activated neuron and synapse circuitry units (e.g., circuitry blocks 414, 428, 417, and 431 or 416, 430, 415, and 429) can take control over the unified memory (e.g., SRAM) in a time-multiplexed manner if the memory has a single read port, a single write port, or a single combined read and write port, or can work in parallel if the memory is capable of multi-port reads and writes.

Connectivity circuitry 432 and 434 may include circuitry for determining interconnected neurons and synapses of the various neuro-synaptic cores of the system. For example, when a particular neuron spikes, connectivity circuitry 432 or 434 of the neuro-synaptic core that is configured as a neuron core may be accessed to determine which neuro-synaptic cores include synapse weights for connections from the spiking neuron to the fan-out neurons. As another example, when a synapse weight is to be sent to a neuron, connectivity circuitry 432 or 434 of the neuro-synaptic core that is configured as a synapse core may be accessed to determine which neuro-synaptic core has the target neuron. The connectivity circuitry may be used for other purposes as well, for example, to direct back spikes or learn messages that may be used in online learning schemes. Connectivity circuitry 432 or 434 may be placed in any suitable location of neuro-synaptic core block 308. Connectivity circuitry 432 and 434 may be implemented via look-up-tables, pointer based connections, mathematical mapping functions, or other suitable connectivity schemes.

Although the output of the first neuro-synaptic core 310 is shown as connected to the input of the second neuro-synaptic core 312 via router 304 and vice versa, in various embodiments the outputs and inputs of the first and second neuro-synaptic cores may be coupled to any number of other neuro-synaptic cores of the system via one or more routers. For example, a synapse weight for a connection between a first neuron and a second neuron may be stored in a first neuro-synaptic core while one or both of the first neuron and second neuron are stored in a different neuro-synaptic cores.

Figure 5:
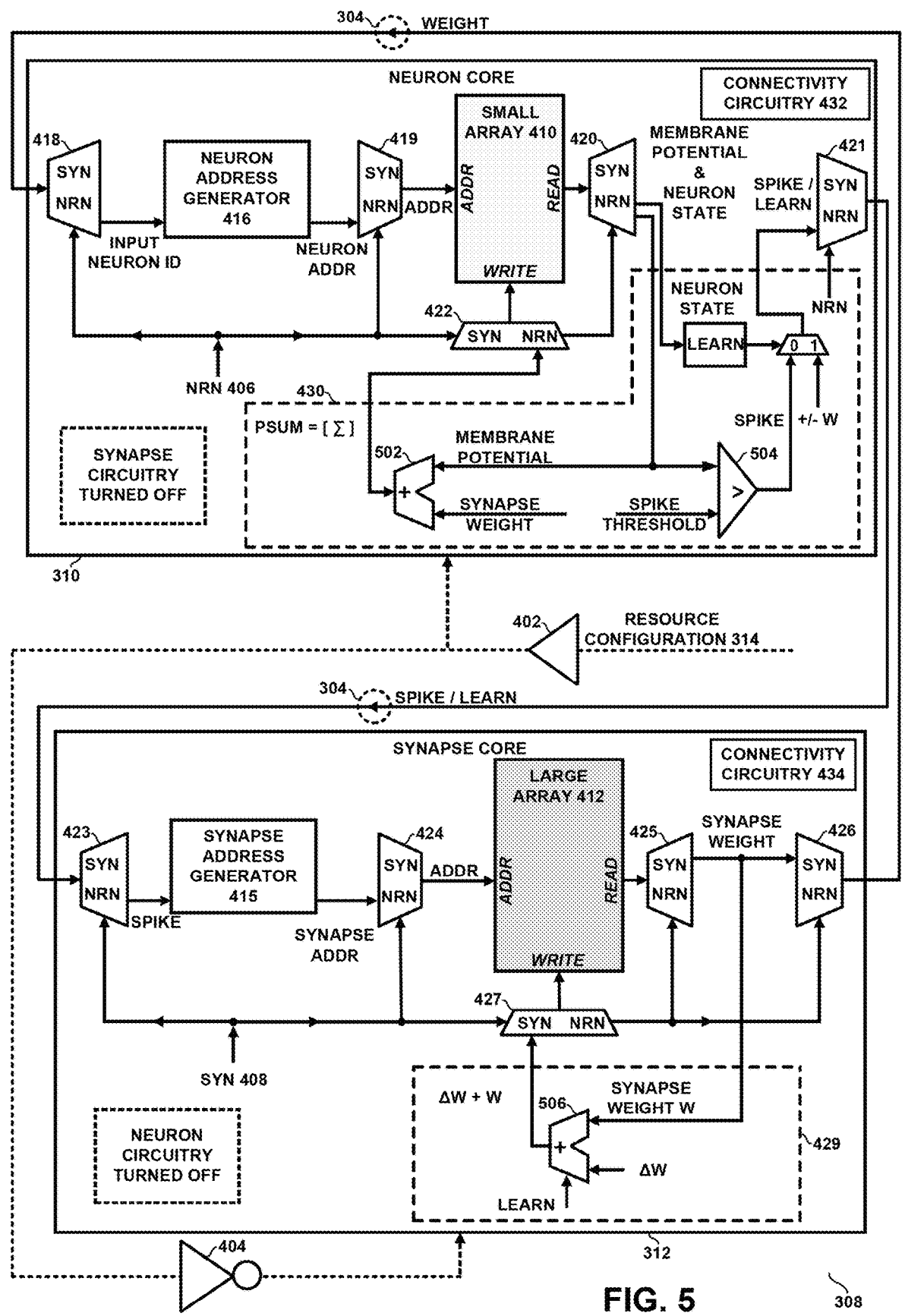
FIG. 5 illustrates a neuro-synaptic core block configured in a synapse-heavy mode in accordance with certain embodiments.

FIG. 5 illustrates a neuro-synaptic core block 308 configured in a synapse-heavy mode in accordance with certain embodiments. In the embodiment depicted, the first neuro-synaptic core 310 is configured as a neuron core and the second neuro-synaptic core 312 is configured as a synapse core. In the synapse-heavy mode, the neuron core with the small array 410 is tasked with storing and updating neuron states and membrane potentials and generating spikes. The synapse core with the large array 412 is tasked with storing a large quantity of synapse weights and sending these weights to appropriate target neurons in association with spiking activity. The synapse core may also be tasked with updating synapse weights if online learning is implemented (in some embodiments, the neuron core may determine when synapse weights are to be updated).

The neuron core implements a group of neurons. In various embodiments, the neurons can be configured as integrate-fire or leaky-integrate-fire (IF or LIF) neurons. The membrane potentials and states of the neurons are stored in the small array 410. In a particular embodiment, the neuron processing circuitry 430 is time-multiplexed across all the neurons of the neuron group to minimize logic area. In a particular embodiment, neuron processing circuitry 430 may perform incoming synapse weight integration, time-step updates, spike generation, and/or other operations associated with the neurons. If online learning is present, then the neuron processing circuitry 430 may also perform learning tasks under appropriate post-to-pre and pre-to-post type neuron connections as well.

Incoming synapse weights are sent to the neuron core by the synapse cores of the neural network. For example, when a neuron spikes, the synapse weights of the connections between the neuron (which may be termed the pre-neuron) and the fan-out neurons (i.e., the post-neurons) may be sent to the fan-out neurons (which may be located in a single neuron core or may span neuron cores of multiple neuro-synaptic cores).

Upon receiving a synapse weight and an identifier of the target neuron (i.e., the neuron receiving the spike), neuron address generator 416 may determine the location of the neuron within the small array 410. The membrane potential of the target neuron is read from the array 410 and updated by neuron processing circuitry 430 based on the incoming synapse weight (e.g., by utilizing adder 502 to accumulate the synapse weight with the membrane potential), and the updated membrane potential is written back to the appropriate address in small array 410.

During a time-step update operation, a neuron's membrane potential is compared against a pre-set threshold by neuron processing circuitry 430 (e.g., by utilizing comparator 504). In various embodiments, this comparison may take place before the membrane potential is updated based on a received spike or after the membrane potential is updated. If the membrane potential is greater than the threshold, the neuron generates a spike. If the potential is not greater than the threshold, the membrane potential of the neuron may remain the same or leak depending on the implemented neuron behavior (e.g., IF or LIF). In various embodiments, a bias (which may be constant or dynamic) may also be used to adjust the membrane potential each timestep. Once a neuron generates a spike, the membrane potential of the neuron is reset and the neuron enters a refractory period during which it cannot spike (e.g., the membrane potential may remain at the reset value). When the refractory period is over (typically in several time-steps), the neuron resumes normal operation. If on-line learning such as a spike-timing dependent plasticity (STDP) mechanism is implemented, then the neuron may also keep track of spike times with an appropriate counting mechanism. Depending on the timing relation between post-to-pre and pre-to-post spikes, the neuron may generate a learn signal that is sent to the appropriate synapse core to trigger an update of the synapse weight. Neuron processing circuitry 430 may perform any of the operations described above or any other suitable operations associated with neuron operation (e.g., time-step advancement).

The synapse core implemented by the second neuro-synaptic core 312 includes a large array 412 to store synapse weights, which may be single bit or multi-bit weights. The synapse core may be tasked with processing incoming "pre-to-post", "post-to-pre" spikes, and learn signals if online learning is present. In this manner, the synapse core may act as the intermediate communication medium for a pre-neuron and a post-neuron by accessing the synapse weight of the connection between the pre-neuron and the post-neuron and sending the synapse weight to the appropriate pre-neuron or post-neuron (depending on whether the spike is a forward propagating action-potential, i.e. a forward spike or a backward propagating action-potential, i.e. a backward spike) and updating the synapse weight based on an implemented learning rule depending on the spike timing of the pre-neurons and post-neurons.

When a spike is received, the synapse core first accesses the appropriate synapse weight. The synapse address generator 415 may be implemented using a look-up table, a mapping function, logic to process an address pointer supplied by the incoming spike, or other suitable mechanism to determine one or more synapse weights to be accessed based on the received spike (the spike may be sent with any suitable information allowing the identification of synapse weights for the connections between the spiking neuron and the target neurons). Depending on the bit-precision of the synapse weights and the width of the array 412, synapse weights may be stored interleaved within a row or individually by rows of the array 412. Once the synapse weight is read, it is sent out to its target neuron by the synapse core. In various embodiments, multiple synapse weights may be read in succession (e.g., if the synapse core includes synapse weights for multiple fan-out neurons receiving the spike).

If a learn signal is received, the weight is updated with the appropriate learning rule by synapse processing circuitry 429. For instance, for on-line STDP learning rule, long-term potentiation (LTP) is performed and weight is increased by a pre-set delta amount ($\Delta w$) utilizing adder 506 when a post-neuron spikes later than the pre-neuron within a time window for learning. Conversely, long-term depression (LTD) is performed and weight is decreased by a pre-set delta amount when the pre-neuron spikes later than the post-neuron within a time window for learning. In various embodiments, neuron processing circuitry 430 may determine whether a learn operation is to be performed and may send a learn message to a synapse core identifying a particular synapse and an indication of whether the synapse weight should be increased or decreased. The synapse processing circuitry 429 (in association with the synapse address generator 415) may access the designated synapse weight, modify the synapse, and write the modified synapse weight back into the large array 412.

Figure 6:
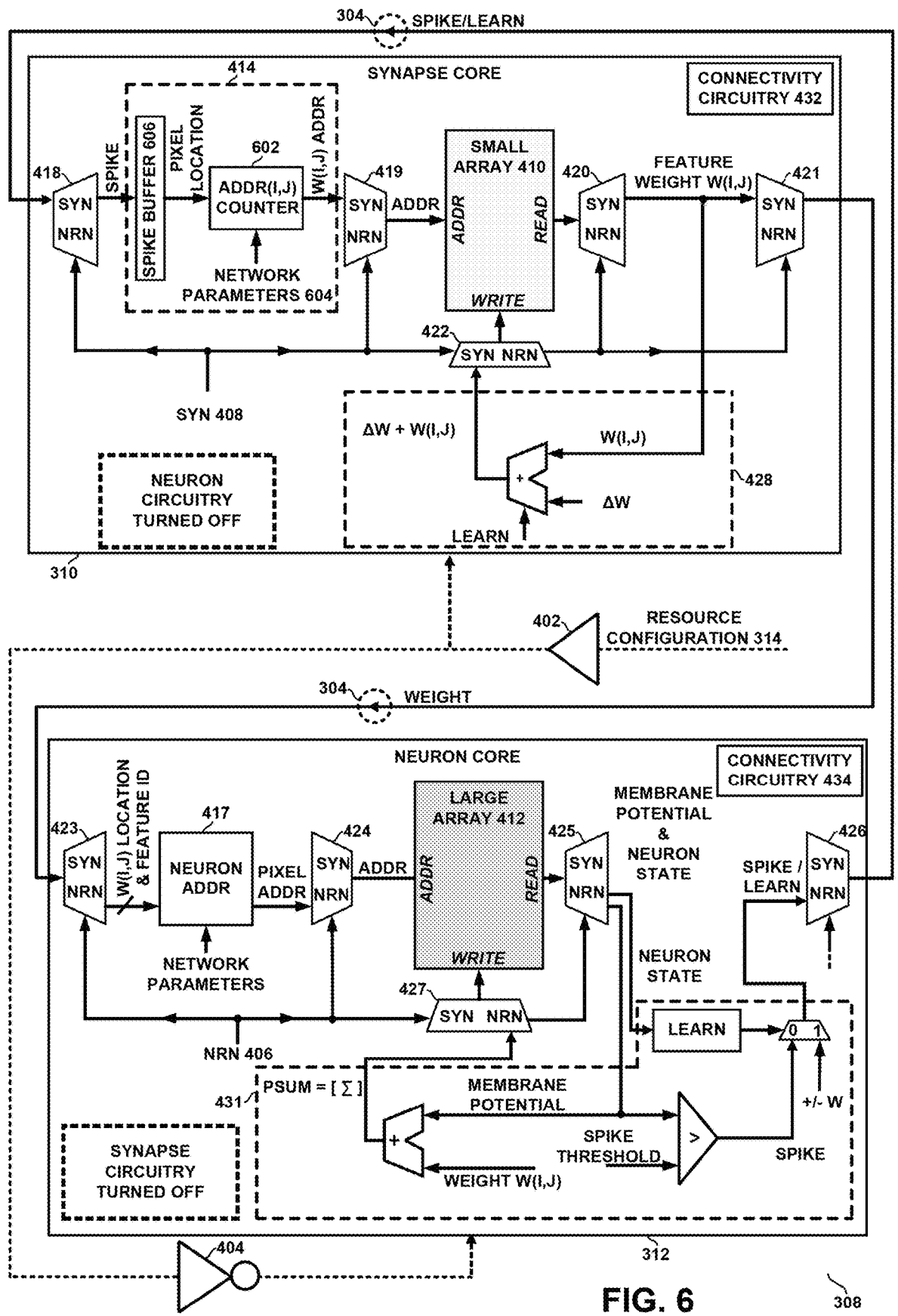
FIG. 6 illustrates a neuro-synaptic core block configured in a neuron-heavy mode in accordance with certain embodiments.

FIG. 6 illustrates a neuro-synaptic core block 308 configured in a neuron-heavy mode in accordance with certain embodiments. In the embodiment depicted, the first neurosynaptic core 310 is configured as a synapse core and the second neuro-synaptic core 312 is configured as a neuron core.

In the neuron-heavy mode, the large array 412 of the neuron core implemented by neuro-synaptic core 312 may store membrane potentials and neuron states of neurons while the small array 410 of the synapse core implemented by neuro-synaptic core 310 may store synapse weights. For example, when the processor 300 is implementing a CNN, the large array 412 may store neurons of one or more activation maps of a CNN and the small array 410 may store synapse weights of one or more features to be shared over the pixel positions of an input image (e.g., when the features are strided across the image). For a deep CNN network, single, multiple, or all convolution layers may be mapped on the available neuro-synaptic cores to work iteratively over multiple runs (convolution layers processed one by one) or in parallel (cascaded convolutional layers processed together in one pass), depending on the available resources.

When the feature weights (i.e., the synapse weights of the features) are shared and stored locally in the small arrays 410 of the system, input image patch spikes may be multicast to all synapse cores storing features for that layer. The input image patches may be stored in neuron cores (e.g., in the large arrays 412 or in other memory), in input cores (not shown) that are dedicated to storing input image patches, or in other suitable locations. In a particular embodiment, the spikes generated for an input image patch may be generated by the neuron cores (e.g., by neuron processing circuitry 431).

The synapse core implemented by neuro-synaptic core 310 may store the shared weights of a single feature or multiple unique features and may update the stored feature weights if on-line learning is implemented. In a deep CNN, feature size (e.g., 3×3, 4×4, 5×5, etc.), stride length (i.e., the number of pixels the feature slides over the input image during each convolution operation), input image size, and convolutional layer (e.g., activation map) size may all be adjustable variables. As a result, a synapse core with small array 410 may support various feature sizes and access patterns for the stored feature weights. Depending on the chosen array size for small array 410 (or number of array banks), one or more features may be stored in the small array 410. Weight bit-precision (i.e., the number of bits used to store each synapse weight) may be variable such that the weights are stored independently per row of the small array 410 or in an interleaved fashion with multiple weights stored in a single row.

Once a spike for a pixel of the input image is received from a neuron core, the synapse core (e.g., via counter 602 of the synapse address generator 414) generates the appropriate address for a corresponding feature weight based on the pixel position of the source neuron and reads out the weight. This feature weight is then sent out to the target neuron core. Since the accessed feature may be shared across multiple pixel positions of the image in a deep CNN (i.e., the feature may overlap with the pixel multiple times as the feature strides across the input image, where each overlap occurs at a different position of the feature), the remaining weights within the feature may also be read-out in a sequential fashion and sent to their target pixel neurons along with an identifier of the feature and an indication of the weight's location within the feature (i.e., W(I, J)). In a particular embodiment, a counter 602 is used to generate the appropriate addresses of the small array 410 based on network parameters (such as stride-length, feature size, and/or bit-precision parameters). If multiple features are stored on the same synapse core, then this operation may be repeated for the remainder of the features for the same input spike. The accessed weights may be sent out from the synapse core one by one or multiple accessed weights (e.g., all of the accessed weights for a particular feature or all of the accessed weights for all features) may be aggregated into a single message sent to one or more neuron cores.

Since the synapse core may require multiple clock cycles to finish all the iterations for accessing the shared weights, a spike buffer 606 may buffer incoming spikes in case one or more additional spikes is received before the first spike is processed. In various embodiments, the spike buffer 606 may be implemented with flip-flops (for a small buffering window) or with a small register file (for a longer buffering window), though any suitable memory structures may be used to implement the spike buffer. When an online learning rule (such as STDP) is implemented, the synapse core (e.g., via synapse processing circuitry 428) may update the weights appropriately (e.g., with LTP or LTD operations) when a learn signal is received.

The neuron core with the large array 412 may integrate incoming synapse weights with partial sums (stored as neuron membrane potentials) to generate the activation maps for each feature and may also generate spikes. The neuron core may also track spike timing if online learning is implemented and send out appropriate learn signals. Membrane potentials of the activation maps (as well as neuron states in some embodiments) are stored in the large array 412, with each neuron of an activation map representing, e.g., the convolution pixel of a feature of size N×N (N being any suitable integer) over the same size input image patch of N×N pixels. When a feature weight is received from a synapse core, the neuron core treats the incoming weight as a "spike×weight" elementwise multiplication of the convolution operation and accesses the target pixel neuron's membrane potential. The incoming weight is then integrated with the membrane potential, and the updated partial sum is written back. The address for the neuron is generated by neuron address generator 417 as a function of the incoming weight's location within a feature (i.e., W(I, J)), the particular feature (e.g., as identified by a feature identifier), feature size (e.g., N×N), stride length, and/or any other suitable parameters. Neurons may thus be accessed in a pixel-multicast fashion, rather than time-multicast fashion. That is, when a particular neuron representing an input pixel spikes, multiple neurons of an activation map (or corresponding neurons of multiple activation maps) that are spatially related based on the feature size N×N and the stride length, may be updated based on multiple feature weights received in succession for those neurons. As in the synapse-heavy mode, the neurons of a neuron group that represent an activation map may be IF or LIF neurons (typically IF type neurons are chosen for spiking deep CNN networks as they inherently perform the partial sum accumulation and activation, although the disclosure is not limited thereto). When a neuron passes a threshold, a spike is generated.

The manner in which a spike from a convolutional layer is sent depends on the mapping of the network on the hardware of the neuromorphic processor. In a particular embodiment, if a single convolutional layer is mapped on neuro-synaptic core block 308, then the generated spikes may be stored on the same large array 412 within the neuron state as a single bit. If multiple and cascaded convolutional layers are mapped on the processor, then the spike may be multicast to target synapse cores which store the features of the subsequent layer in the CNN hierarchy, such as a pooling layer. These spikes then trigger the next layer operations by repeating the processing tasks (e.g., as explained above) in a synapse core. A learn signal may be generated and sent in a fashion similar to that described above with respect to the synapse-heavy mode.

Figure 7A:
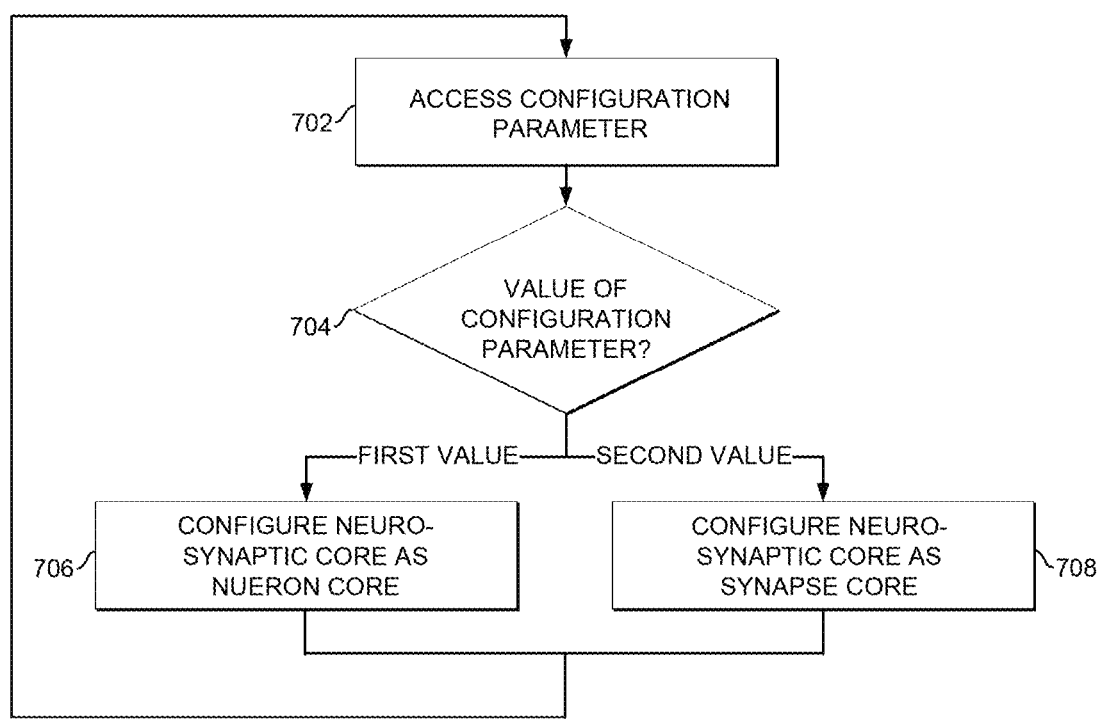
FIG. 7A illustrates a flow for configuring a neuro-synaptic core in accordance with certain embodiments.

FIG. 7A illustrates a control flow for configuring a neuro-synaptic core in accordance with certain embodiments. The flow may be performed by any suitable hardware such as circuitry of a neuro-synaptic core (e.g., 310 or 312). At 702, a configuration parameter (e.g., 314) is accessed. In a particular embodiment, the configuration parameter may be a global configuration parameter that is provided to all of the neuro-synaptic cores. In another embodiment, the configuration parameter may be a configuration parameter that is specific to the neuro-synaptic core or to a group of neuro-synaptic cores that includes the neuro-synaptic core.

At 704, a value of the configuration parameter is determined. If the value specifies a first value, the flow moves to 706 where the neuro-synaptic core configures itself as a neuron core. A neuro-synaptic core configured as a neuron core may access a memory that is used to store neuron membrane potentials and/or neuron states. When a neuro-synaptic core is configured as a neuron core, synapse addressing and processing circuitry of the neuro-synaptic core may be deactivated (e.g., power gated) to save power. The synapse addressing circuitry that is deactivated may include, e.g., circuitry to address synapse weights stored in the respective second memories when the neuro-synaptic core is configured as a synapse core. Similarly, the synapse processing circuitry that is deactivated may include, e.g., circuitry to process synapse weights when the neuro-synaptic core is configured as a synapse core.

At 704, if the value specifies a second value, the flow moves to 708 where the neuro-synaptic core configures itself as a synapse core. A neuro-synaptic core that is configured as a synapse core may access a memory that is used to store synapse weights. When the neuro-synaptic core is configured as a synapse core, neuron addressing and processing circuitry of the neuro-synaptic core may be deactivated (e.g., power gated) by the core to save power. The neuron addressing circuitry that is deactivated may include, e.g., circuitry to address membrane potentials and/or neuron states stored in the memory when the neuro-synaptic core is configured as a neuron core. Similarly, the neuron processing circuitry that is deactivated may include, e.g., circuitry to process membrane potentials and/or neuron states when the neuro-synaptic core is configured as a neuron core.

Figure 7B:
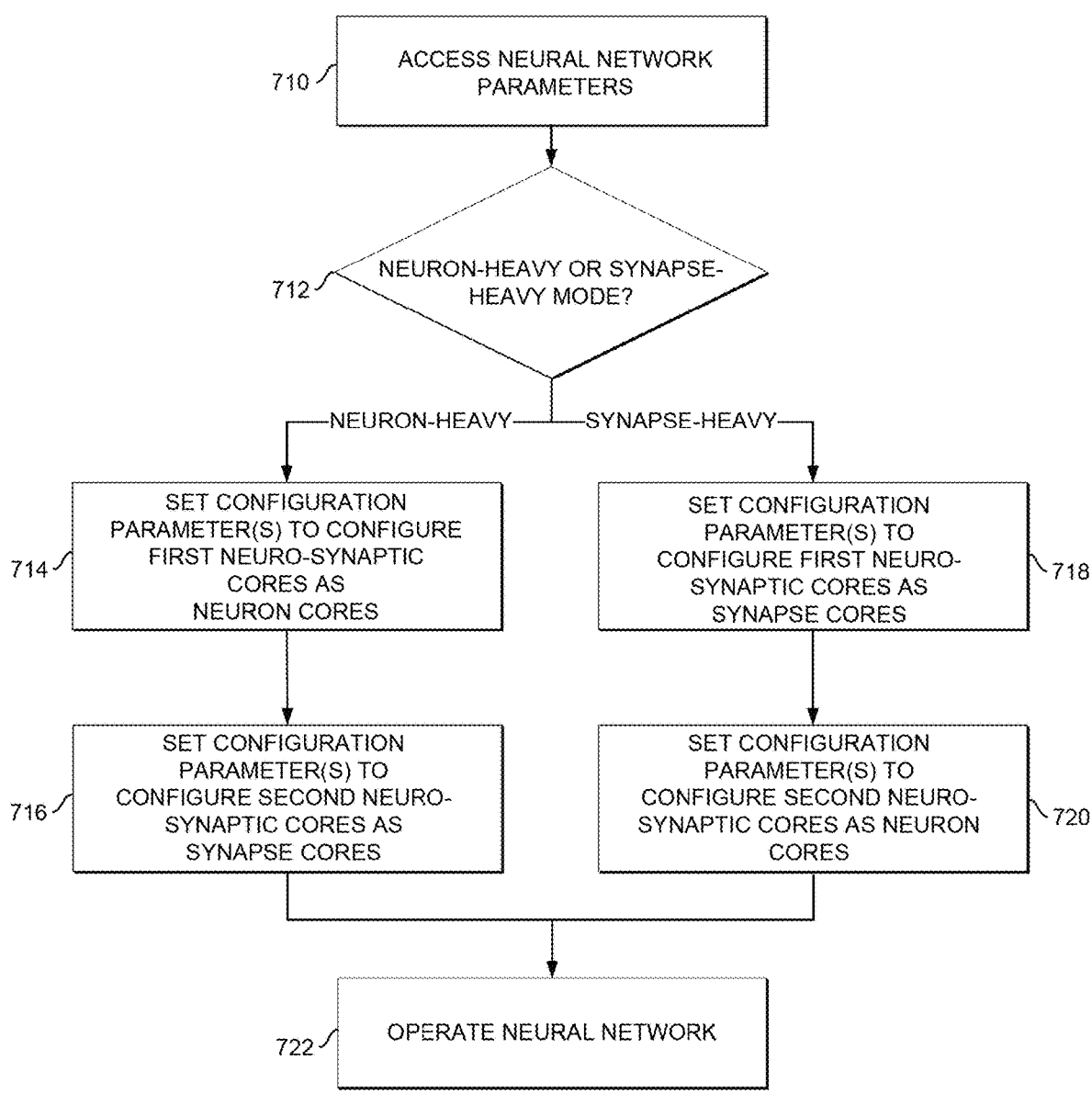
FIG. 7B illustrates a flow for configuring neuro-synaptic cores in accordance with certain embodiments.

FIG. 7B illustrates a control flow for configuring neuro-synaptic core blocks for operation in accordance with certain embodiments. Any one or more operations of the flow may be performed by a processor (e.g., 300 or 350 or a processor coupled to a neuromorphic processor) using special purpose circuitry and/or by executing software instructions, an FPGA, or other integrated circuit capable of configuring neurosynaptic cores of a neural network. At 710, neural network parameters are accessed. In various embodiments, a user (or other suitable entity) may specify neural network parameters via a graphical user interface or other computing interface and these parameters may be received by or transmitted to the processor 300 (or other logic performing the flow) via any suitable network or interconnect (such as any of the interfaces described herein or other suitable interfaces). The neural network parameters may include any suitable parameters. For example, the neural network parameters may specify a type of network (e.g., feedforward, recurrent, CNN, or any other type of neural network), a number of neurons in one or more layers of the neural network, a number of synapse weights, the values of synapse weights, sparsity, biases, leakage parameters, input images, features, stride length, and/or any other suitable parameters.

At 712, a determination is made as to whether the neuromorphic processor should be placed into a neuron-heavy mode or a synapse-heavy mode. For example, if the number of neurons is greater than the number of synapses, the processor may be placed into a neuron-heavy mode, and if the number of synapses is greater than the number of neurons, the processor may be placed into a synapse-heavy mode. As another example, the neural network type may dictate the mode (e.g., a feedforward neural network may correspond to a synapse-heavy mode while a weight sharing neural network such as a CNN may correspond to a neuron-heavy mode). As yet another example, the mode may be explicitly specified as one of the neural network parameters or inferred from one or more other neural network parameters. The mode may be determined in any other suitable manner.

If the mode is set to neuron-heavy, the flow moves to 714, where one or more configuration parameters are set to cause a plurality of first neurosynaptic cores to be configured as neuron cores and 716, where one or more configuration parameters are set to cause a plurality of second neurosynaptic cores to be configured as synapse cores. In a particular embodiment where all neuromorphic processors access a common configuration parameter, 714 and 716 may be performed by setting the common configuration parameter while in other embodiments, 714 and 716 may include setting multiple configuration parameters that are each provided to one or more neuro-synaptic cores.

In response to 714, circuitry of (or otherwise associated with) each first neurosynaptic core may access a respective configuration parameter (which in some embodiments may be the same configuration parameter when the configuration parameter is shared among multiple cores) and configure the first neurosynaptic core as a neuron core based on the value of the configuration parameter. In response to 716, circuitry of (or otherwise associated with) each second neurosynaptic core may access a respective configuration parameter (which in some embodiments may be the same configuration parameter when the configuration parameter is shared among multiple cores) and configure the second neurosynaptic core as a neuron core based on the value of the configuration parameter.

If instead the mode is set to synapse-heavy, the flow moves to 718, where one or more configuration parameters are set to cause a plurality of first neurosynaptic cores to be configured as synapse cores and 720, where one or more configuration parameters are set to cause a plurality of second neurosynaptic cores to be configured as neuron cores. In a particular embodiment where all neuromorphic processors access a common configuration parameter, 718 and 720 may be performed by setting the common configuration parameter while in other embodiments, 718 and 720 may include setting multiple configuration parameters that are each provided to one or more neuro-synaptic cores.

In response to 718, circuitry of (or otherwise associated with) each first neurosynaptic core may access a respective configuration parameter (which in some embodiments may be the same configuration parameter when the configuration parameter is shared among multiple cores) and configure the first neurosynaptic core as a synapse core based on the value of the configuration parameter. In response to 720, circuitry of (or otherwise associated with) each second neurosynaptic core may access a respective configuration parameter (which in some embodiments may be the same configuration param-eter when the configuration parameter is shared among multiple cores) and configure the second neurosynaptic core as a synapse core based on the value of the configuration parameter.

In various embodiments, if particular neuro-synaptic cores are not needed to implement the neural network (e.g., because all of the neurons and synapses may be implemented by the other cores), these cores may be disabled (e.g., power gated) to reduce power consumption.

At 722, the neural network of the processor begins operation. The neuron cores may generate spikes that are sent to the synapse cores. The synapse cores may access synapse weights associated with the spikes and send these weights to the appropriate neuron cores, which may use the weights to update membrane potentials and/or neuron states. Any other suitable operation may be performed during neural network operation. At any suitable time (e.g., during and/or after operation of the neural network), results (e.g., spike rates, processing results, or decisions based on processing results) of the neural network may be provided to any suitable entity, e.g., via a display or other interface. In some embodiments, the results may be transmitted through a network interface to a remote computing system.

At any suitable time, the user (or other entity) may change the neural network parameters to implement a different neural network on the processor. The flow may be repeated to configure the neuro-synaptic cores as neuron cores and synapse cores according to the neural network parameters.

Some of the blocks illustrated in FIGS. 7A and 7B may be repeated, combined, modified or deleted where appropriate, and additional blocks may also be added to the flowchart. Additionally, blocks may be performed in any suitable order (including simultaneously) without departing from the scope of particular embodiments.

The figures below detail exemplary architectures and systems to implement embodiments of the above. For example, the processor 300 may be included within any of the processors or systems described below. In various embodiments, the processor 300 may communicate with any of the processors, interfaces, or other components described below. For example, processor 300 may receive neural network parameters from one or more of these components and provide results of the neural network operation to one or more of these components. In some embodiments, one or more hardware components and/or instructions described above are emulated as detailed below, or implemented as software modules.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 8A is a block diagram illustrating both an exemplary in-order pipeline and an exemplary register renaming, out-of-order issue/execution pipeline according to embodiments of the disclosure. FIG. 8B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression and/or decompression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIGS. 9A-B illustrate a block diagram of a more specific exemplary in-order core architecture, which core would be one of several logic blocks (potentially including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to various embodiments. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments may use a different approach (e.g., use a single register set or include a communication path that allow data to be transferred between the two register files without being written and read back).

The local subset of the L2 cache 904 is part of a global L2 cache that is divided into separate local subsets (in some embodiments one per processor core). Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. In a particular embodiment, each ring data-path is 1012-bits wide per direction.

FIG. 9B is an expanded view of part of the processor core in FIG. 9A according to embodiments. FIG. 9B includes an L1 data cache 906A (part of the L1 cache 906), as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Figure 10:
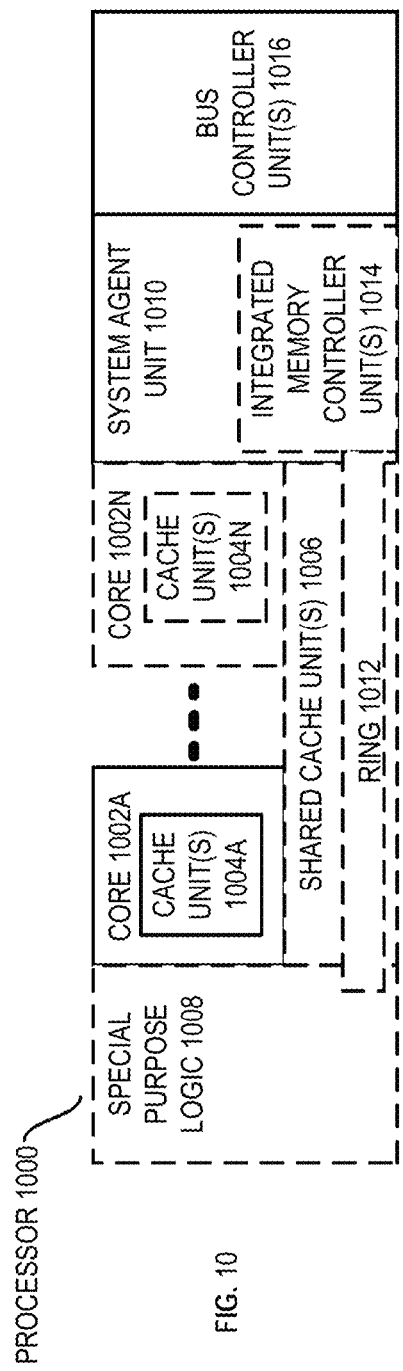
FIG. 10 is a block diagram of a processor that may have more than one core, may have an integrated memory controller, and may have integrated graphics in accordance with certain embodiments.

FIG. 10 is a block diagram of a processor 1000 that may have more than one core, may have an integrated memory controller, and may have integrated graphics according to various embodiments. The solid lined boxes in FIG. 10 illustrate a processor 1000 with a single core 1002A, a system agent 1010, and a set of one or more bus controller units 1016; while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, or a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression and/or decompression engine, graphics processor, GPGPU (general purpose graphics processing unit), a high-throughput many integrated core (MIC) coprocessor (e.g., including 30 or more cores), embedded processor, or other fixed or configurable logic that performs logical operations. The processor may be implemented on one or more chips. The processor 1000 may be a part of and/or may be implemented on one or more substrates using any of a number of process technologies, such as, for example, BiCMOS, CMOS, or NMOS.

In various embodiments, a processor may include any number of processing elements that may be symmetric or asymmetric. In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the special purpose logic (e.g., integrated graphics logic) 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002A-N.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the special purpose logic 1008. The display unit is for driving one or more externally connected displays.

The cores 1002A-N may be homogenous or heterogeneous in terms of architecture instruction set; that is, two or more of the cores 1002A-N may be capable of executing the same instruction set, while others may be capable of executing only a subset of that instruction set or a different instruction set.

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable for performing the methods described in this disclosure. In general, a huge variety of systems or electronic devices capable of incorporating a processor and/or other execution logic as disclosed herein are generally suitable.

Figure 11:
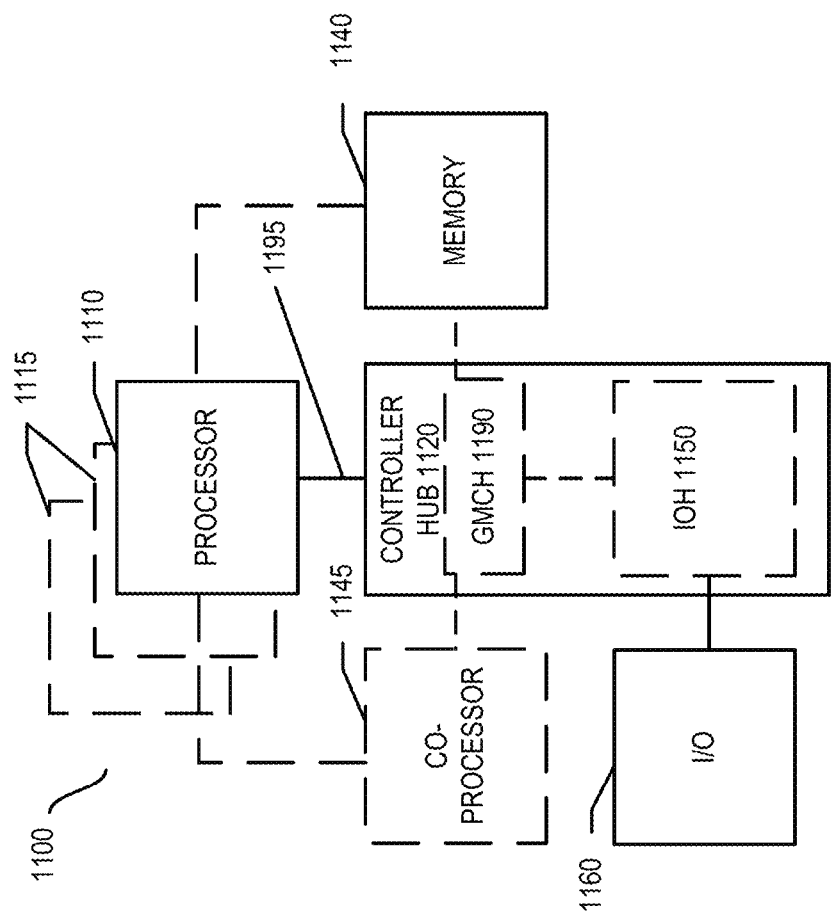
FIGS. 11, 12, 13, and 14 are block diagrams of exemplary computer architectures in accordance with certain embodiments.

FIG. 11 depicts a block diagram of a system 1100 in accordance with one embodiment of the present disclosure. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips or the same chip); the GMCH 1190 includes memory and graphics controllers coupled to memory 1140 and a coprocessor 1145; the IOH 1150 couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 is a single chip comprising the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), other suitable memory, or any combination thereof. The memory 1140 may store any suitable data, such as data used by processors 1110, 1115 to provide the functionality of computer system 1100. For example, data associated with programs that are executed or files accessed by processors 1110, 1115 may be stored in memory 1140. In various embodiments, memory 1140 may store data and/or sequences of instructions that are used or executed by processors 1110, 1115.

In at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression and/or decompression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
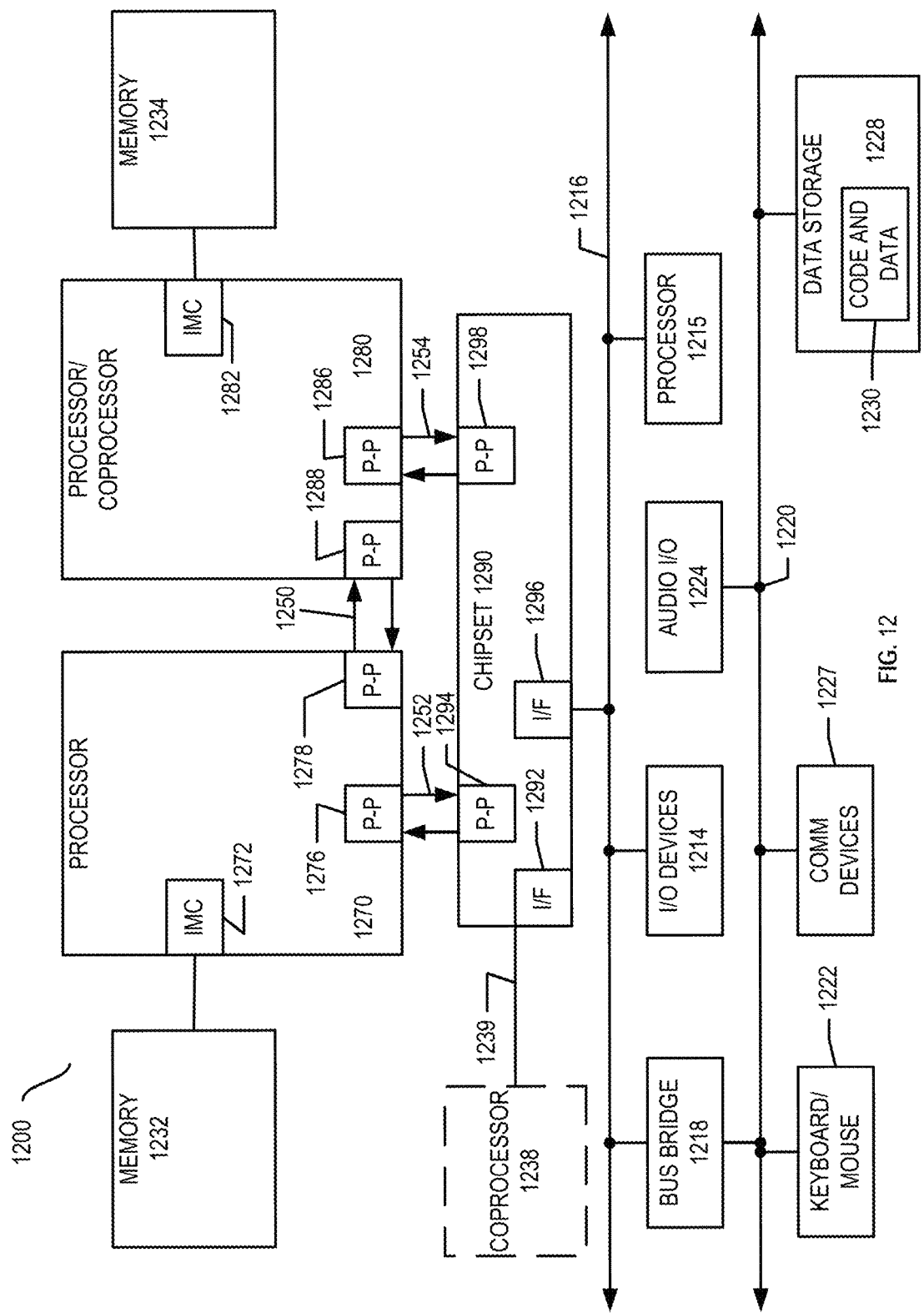

FIG. 12 depicts a block diagram of a first more specific exemplary system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the disclosure, processors 1270 and 1280 are respectively processors 1110 and 1115, while coprocessor 1238 is coprocessor 1145. In another embodiment, processors 1270 and 1280 are respectively processor 1110 and coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression and/or decompression engine, graphics processor, GPGPU, embedded processor, or the like.

A shared cache (not shown) may be included in either processor or outside of both processors, yet connected with the processors via a P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are contemplated by this disclosure. For example, instead of the point-to-point architecture of FIG. 12, a system may implement a multi-drop bus or other such architecture.

Figure 13:
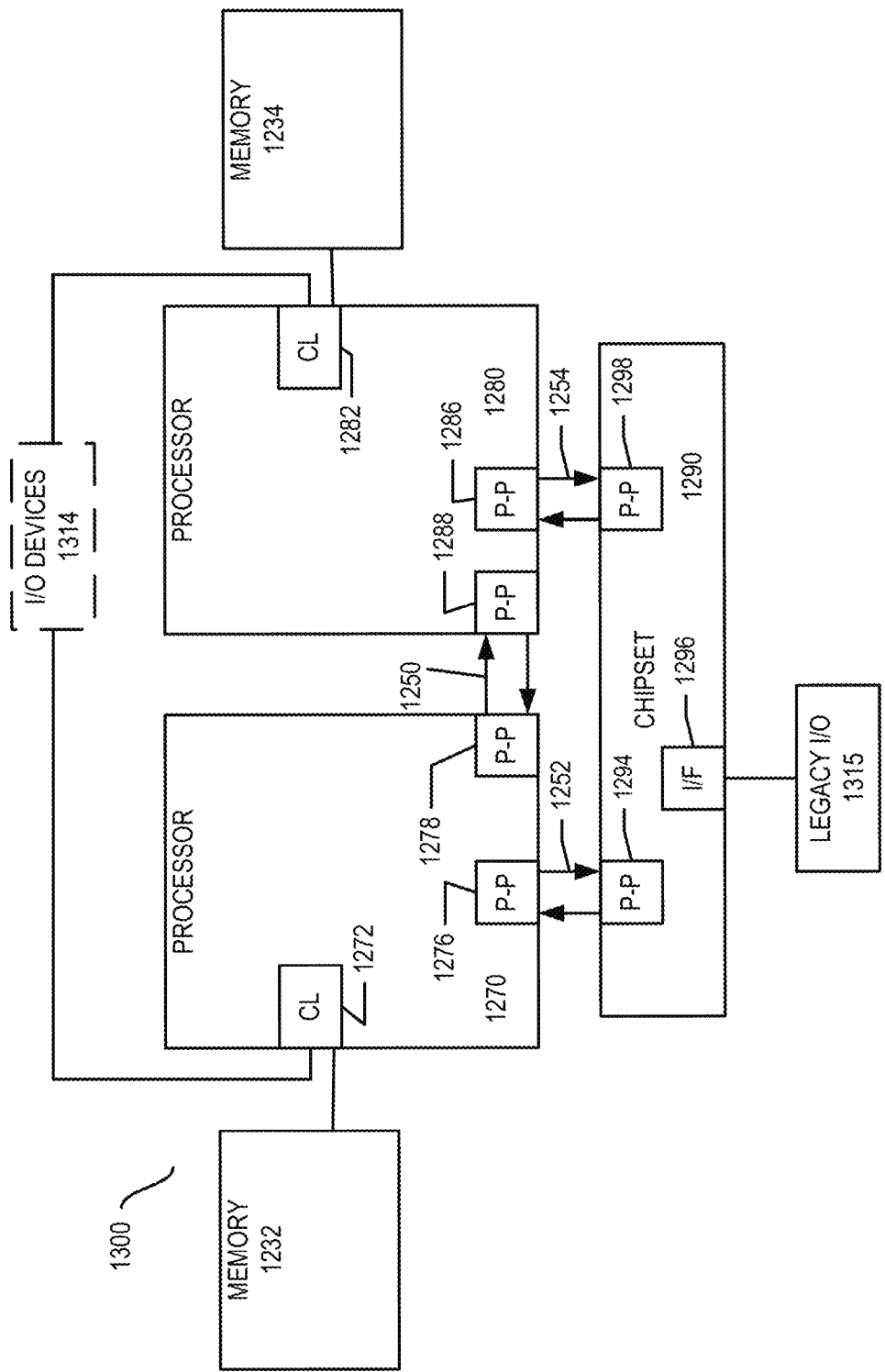

FIG. 13 depicts a block diagram of a second more specific exemplary system 1300 in accordance with an embodiment of the present disclosure. Similar elements in FIGS. 12 and 13 bear similar reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
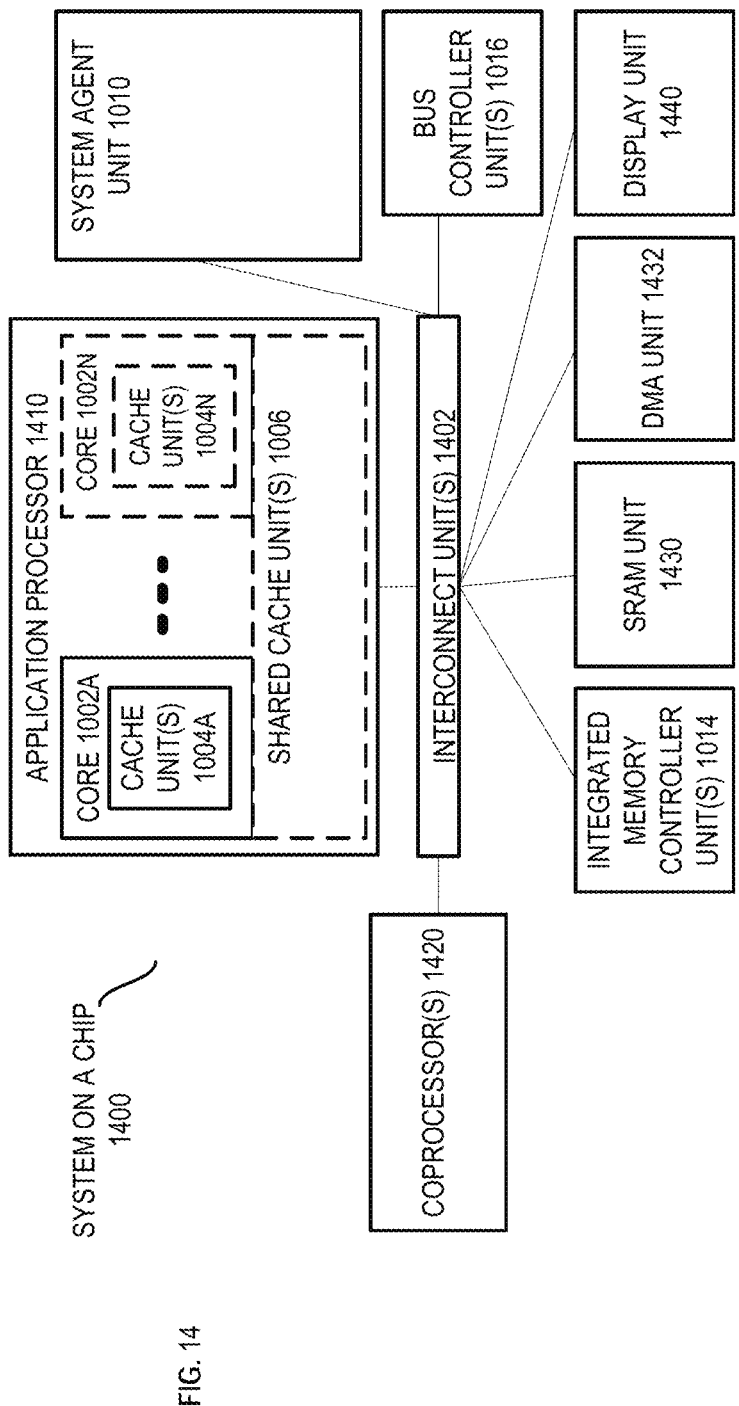

FIG. 14 depicts a block diagram of a SoC 1400 in accordance with an embodiment of the present disclosure. Similar elements in FIG. 10 bear similar reference numerals. Also, dashed lined boxes are optional features on more advanced SoCs. In FIG. 14, an interconnect unit(s) 1402 is coupled to: an application processor 1410 which includes a set of one or more cores 1002A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression and/or decompression engine, GPGPU, a high-throughput MIC processor, embedded processor, or the like.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the manufacture of the described hardware.

In any representation of the design, the data representing the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

Thus, one or more aspects of at least one embodiment may be implemented by representative instructions stored on a machine-readable medium which represents various logic within the processor, which when read by a machine causes the machine to fabricate logic to perform the techniques described herein. Such representations, often referred to as "IP cores" may be stored on a non-transitory tangible machine readable medium and supplied to various customers or manufacturing facilities to load into the fabrication machines that manufacture the logic or processor.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In various embodiments, the language may be a compiled or interpreted language.

The embodiments of methods, hardware, software, firmware or code set forth above may be implemented via instructions or code stored on a machine-accessible, machine readable, computer accessible, or computer readable medium which are executable (or otherwise accessible) by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Logic may be used to implement any of the functionality of the various components such as the processors described herein (e.g., 300), network elements 102 and 302, routers 104 and 304, core 108, core block 308, neuro-synaptic cores 310 and 312, memory arrays (e.g., 410 and 412), synapse address generator 414 and 415, neuron address generator 416 and 417, other component described herein, or any subcomponent of any of these components. Moreover, logic may be used in conjunction with any of the components herein (e.g., synapse processing circuitry 428 and 429, neuron processing circuitry 430 and 431, and connectivity circuitry 432 and 434) to facilitate functionality of the components. "Logic" may refer to hardware, firmware, software and/or combinations of each to perform one or more functions. As an example, logic may include hardware, such as a micro-controller or processor, associated with a non-transitory medium to store code adapted to be executed by the micro-controller or processor. Therefore, reference to logic, in one embodiment, refers to the hardware, which is specifically configured to recognize and/or execute the code to be held on a non-transitory medium. Furthermore, in another embodiment, use of logic refers to the non-transitory medium including the code, which is specifically adapted to be executed by the microcontroller to perform predetermined operations. And as can be inferred, in yet another embodiment, the term logic (in this example) may refer to the combination of the hardware and the non-transitory medium. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components, which may be implemented by, e.g., transistors. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Often, logic boundaries that are illustrated as separate commonly vary and potentially overlap. For example, first and second logic may share hardware, software, firmware, or a combination thereof, while potentially retaining some independent hardware, software, or firmware.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, hardware, and/or element designed in such a way to enable use of the apparatus, hardware, and/or element in a specified manner. Note as above that use of to, capable to, or operable to, in one embodiment, refers to the latent state of an apparatus, hardware, and/or element, where the apparatus, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

In at least one embodiment, a processor comprises a first neuro-synaptic core comprising first circuitry to configure the first neuro-synaptic core as a neuron core responsive to a first value specified by a configuration parameter; and configure the first neuro-synaptic core as a synapse core responsive to a second value specified by the configuration parameter.

In an embodiment, a processor further comprises a second neuro-synaptic core, wherein the second neuro-synaptic core comprises second circuitry to configure the second neuro-synaptic core as a neuron core responsive to the second value specified by the configuration parameter; and configure the second neuro-synaptic core as a synapse core responsive to the first value specified by the configuration parameter. In an embodiment, the first neuro-synaptic core comprises a first memory array and the second neuro-synaptic core comprises a second memory array, wherein the first memory array is larger than the second memory array. In an embodiment, the first memory array is a static random access memory (SRAM) and the second memory array is a register file. In an embodiment, first memory array is a first portion of a shared memory and the second memory array is a second portion of the shared memory. In an embodiment, the synapse core is to store synapse weights and the neuron core is to store neuron membrane potentials. In an embodiment, the neuron core is to generate a neuron spike responsive to a neuron's membrane potential exceeding a threshold and send the neuron spike to a second neuro-synaptic core configured as a synapse core to access at least one synapse weight stored by the second neuro-synaptic core. In an embodiment, the first circuitry of the first neuro-synaptic core is to disable second circuitry of the first neuro-synaptic core and enable third circuitry of the first neuro-synaptic core responsive to the first value specified by the configuration parameter; and disable the third circuitry and enable the second circuitry responsive to the second value specified by the configuration parameter. In an embodiment, the configuration parameter is a global configuration parameter to specify whether a plurality of first neuro-synaptic cores of the processor are to be configured as neuron cores or synapse cores. In an embodiment, the processor is to implement a feedforward neural network or a recurrent neural network during a period of time in which the configuration parameter specifies the second value. In an embodiment, the processor is to implement a convolutional neural network during a period of time in which the configuration parameter specifies the first value. In an embodiment, the first neuro-synaptic core is coupled to a plurality of neuro-synaptic cores of the processor via one or more routers of a network on chip.

In at least one embodiment, a method comprises configuring, by first circuitry, a first neuro-synaptic core as a neuron core responsive to a first value specified by a configuration parameter; and configuring, by the first circuitry, the first neuro-synaptic core as a synapse core responsive to a second value specified by the configuration parameter.

In an embodiment, a method further comprises configuring the second neuro-synaptic core as a neuron core responsive to the second value specified by the configuration parameter; and configuring the second neuro-synaptic core as a synapse core responsive to the first value specified by the configuration parameter. In an embodiment, the first neuro-synaptic core comprises a first memory array and the second neuro-synaptic core comprises a second memory array, wherein the first memory array is larger than the second memory array. In an embodiment, the first memory array is a static random access memory (SRAM) and the second memory array is a register file. In an embodiment, the first memory array is a first portion of a shared memory and the second memory array is a second portion of the shared memory. In an embodiment, a method further comprises storing synapse weights by the synapse core and storing neuron membrane potentials by the neuron core. In an embodiment, a method further comprises generating a neuron spike by the neuron core responsive to a neuron's membrane potential exceeding a threshold; and sending the neuron spike to a second neuro-synaptic core configured as a synapse core to access at least one synapse weight stored by the second neuro-synaptic core. In an embodiment, a method further comprises disabling second circuitry of the first neuro-synaptic core and enabling third circuitry of the first neuro-synaptic core responsive to the first value specified by the configuration parameter; and disabling the third circuitry and enabling the second circuitry responsive to the second value specified by the configuration parameter. In an embodiment, the configuration parameter is a global configuration parameter to specify whether a plurality of first neuro-synaptic cores of the processor are to be configured as neuron cores or synapse cores. In an embodiment, a method further comprises implementing, by the processor, a feed-forward neural network or a recurrent neural network during a period of time in which the configuration parameter specifies the second value. In an embodiment, a method further comprises implementing, by the processor, a convolutional neural network during a period of time in which the configuration parameter specifies the first value. In an embodiment, the first neuro-synaptic core is coupled to a plurality of neuro-synaptic cores of the processor via one or more routers of a network on chip.

In at least one embodiment, a non-transitory machine readable storage medium includes instructions stored thereon, the instructions when executed by a machine to cause the machine to access neural network parameters and configure a plurality of neuro-synaptic cores to implement a neural network specified by the neural network parameters; and set, based on one or more of the neural network parameters, a configuration parameter to specify either a first value or a second value, wherein first circuitry of a first neuro-synaptic core of the plurality of neuro-synaptic cores is to configure the first neuro-synaptic core as a neuron core responsive to a first value specified by a configuration parameter; and configure the first neuro-synaptic core as a synapse core responsive to a second value specified by the configuration parameter.

In an embodiment, the synapse core is to store synapse weights and the neuron core is to store neuron membrane potentials. In an embodiment, the neuron core is to generate a neuron spike responsive to a neuron's membrane potential exceeding a threshold and send the neuron spike to a second neuro-synaptic core configured as a synapse core to access at least one synapse weight stored by the second neuro-synaptic core. In an embodiment, the first circuitry of the first neuro-synaptic core is to disable second circuitry of the first neuro-synaptic core and enable third circuitry of the first neuro-synaptic core responsive to a first value specified by the configuration parameter; and disable the third circuitry and enable the second circuitry responsive to a second value specified by the configuration parameter.

In at least one embodiment, a system comprises a memory; and a processor comprising a plurality of first neuro-synaptic cores; wherein the processor is to set one or more configuration parameters, the configuration parameter to specify either a first value or a second value; cause the plurality of first neuro-synaptic cores to be configured as neuron cores responsive to the first value specified by the one or more configuration parameters; and cause the plurality of first neuro-synaptic cores to be configured as synapse cores responsive to a second value specified by the one or more configuration parameters.

In an embodiment, the processor further comprises a plurality of second neuro-synaptic cores, the processor cause the plurality of second neuro-synaptic cores to be configured as synapse cores responsive to the first value specified by the one or more configuration parameters; and cause the plurality of second neuro-synaptic cores to be configured as neuron cores responsive to the second value specified by the one or more configuration parameters. In an embodiment, a system further comprises a network interface to transmit results generated by the neural network. In an embodiment, a system further comprises a display to display results generated by the neural network. In an embodiment, a system further comprises a cellular communication interface. In an embodiment, an apparatus further comprises a battery communicatively coupled to the processor, a display communicatively coupled to the processor, or a network interface communicatively coupled to the processor.

In at least one embodiment, a system comprises means for configuring, by first circuitry, a first neuro-synaptic core as a neuron core responsive to a first value specified by a configuration parameter; and means for configuring, by the first circuitry, the first neuro-synaptic core as a synapse core responsive to a second value specified by the configuration parameter.

In an embodiment, a system further comprises means for storing synapse weights by the synapse core and storing neuron membrane potentials by the neuron core. In an embodiment, a system further comprises means for generating a neuron spike by the neuron core responsive to a neuron's membrane potential exceeding a threshold; and means for sending the neuron spike to a second neuro-synaptic core configured as a synapse core to access at least one synapse weight stored by the second neuro-synaptic core. In an embodiment, a system further comprises means for disabling second circuitry of the first neuro-synaptic core and enabling third circuitry of the first neuro-synaptic core responsive to the first value specified by the configuration parameter; and means for disabling the third circuitry and enabling the second circuitry responsive to the second value specified by the configuration parameter.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
 a first neuro-synaptic core comprising circuitry to:
  configure the first neuro-synaptic core as a neuron core responsive to a first value specified by a configuration parameter; and
  configure the first neuro-synaptic core as a synapse core responsive to a second value specified by the configuration parameter, wherein configuring the first neuro-synaptic core as the neuron core comprises enabling neuron processing circuitry of the first neuro-synaptic core, the neuron processing circuitry to update neuron states, and wherein configuring the first neuro-synaptic core as the synapse core comprises disabling the neuron processing circuitry of the first neuro-synaptic core.

2. The processor of claim 1, further comprising a second neuro-synaptic core comprising second circuitry to:
configure the second neuro-synaptic core as a neuron core responsive to the second value specified by the configuration parameter; and
configure the second neuro-synaptic core as a synapse core responsive to the first value specified by the configuration parameter.

3. The processor of claim 2, wherein the first neuro-synaptic core comprises a first memory array and the second neuro-synaptic core comprises a second memory array, wherein the first memory array is larger than the second memory array.

4. The processor of claim 3, wherein the first memory array is a static random access memory (SRAM) and the second memory array is a register file.

5. The processor of claim 3, wherein the first memory array is a first portion of a shared memory and the second memory array is a second portion of the shared memory.

6. The processor of claim 1, wherein the synapse core is to store synapse weights and the neuron core is to store neuron membrane potentials.

7. The processor of claim 1, wherein the neuron core is to generate a neuron spike responsive to a neuron's membrane potential exceeding a threshold and send the neuron spike to a second neuro-synaptic core configured as a synapse core to access at least one synapse weight stored by the second neuro-synaptic core.

8. The processor of claim 1, wherein the circuitry of the first neuro-synaptic core is to:
disable a second circuitry of the first neuro-synaptic core and enable a third circuitry of the first neuro-synaptic core responsive to the first value specified by the configuration parameter; and
disable the third circuitry and enable the second circuitry responsive to the second value specified by the configuration parameter.

9. The processor of claim 1, wherein the configuration parameter is a global configuration parameter to specify whether a plurality of first neuro-synaptic cores of the processor are to be configured as neuron cores or synapse cores.

10. The processor of claim 1, wherein the processor is to implement a feedforward neural network or a recurrent neural network during a period of time in which the configuration parameter specifies the second value.

11. The processor of claim 1, wherein the processor is to implement a convolutional neural network during a period of time in which the configuration parameter specifies the first value.

12. The processor of claim 1, wherein the first neuro-synaptic core is coupled to a plurality of neuro-synaptic cores of the processor via one or more routers of a network on chip.

13. A method comprising:
configuring, by circuitry, a first neuro-synaptic core as a neuron core responsive to a first value specified by a configuration parameter; and
configuring, by the circuitry, the first neuro-synaptic core as a synapse core responsive to a second value specified by the configuration parameter, wherein configuring the first neuro-synaptic core as the neuron core comprises enabling neuron processing circuitry of the first neuro-synaptic core, the neuron processing circuitry to update neuron states, and wherein configuring the first neuro-synaptic core as the synapse core comprises disabling the neuron processing circuitry of the first neuro-synaptic core.

14. The method of claim 13, further comprising storing synapse weights by the synapse core and storing neuron membrane potentials by the neuron core.

15. The method of claim 13, further comprising:
generating a neuron spike by the neuron core responsive to a neuron's membrane potential exceeding a threshold; and
sending the neuron spike to a second neuro-synaptic core configured as a synapse core to access at least one synapse weight stored by the second neuro-synaptic core.

16. The method of claim 13, further comprising:
disabling a second circuitry of the first neuro-synaptic core and enabling a third circuitry of the first neuro-synaptic core responsive to the first value specified by the configuration parameter; and
disabling the third circuitry and enabling the second circuitry responsive to the second value specified by the configuration parameter.

17. A non-transitory machine readable storage medium having instructions stored thereon, the instructions when executed by a machine to cause the machine to:
access neural network parameters and configure a plurality of neuro-synaptic cores to implement a neural network specified by the neural network parameters; and
set, based on one or more of the neural network parameters, a configuration parameter to specify a first value or a second value, wherein circuitry of a first neuro-synaptic core of the plurality of neuro-synaptic cores is to:
configure the first neuro-synaptic core as a neuron core responsive to a first value specified by the configuration parameter; and
configure the first neuro-synaptic core as a synapse core responsive to a second value specified by the configuration parameter, wherein configuring the first neuro-synaptic core as the neuron core comprises enabling neuron processing circuitry of the first neuro-synaptic core, the neuron processing circuitry to update neuron states, and wherein configuring the first neuro-synaptic core as the synapse core comprises disabling the neuron processing circuitry of the first neuro-synaptic core.

18. The medium of claim 17, wherein the synapse core is to store synapse weights and the neuron core is to store neuron membrane potentials.

19. The medium of claim 17, wherein the neuron core is to generate a neuron spike responsive to a neuron's membrane potential exceeding a threshold and send the neuron spike to a second neuro-synaptic core configured as a synapse core to access at least one synapse weight stored by the second neuro-synaptic core.

20. The medium of claim 17, wherein the circuitry of the first neuro-synaptic core is to:
disable a second circuitry of the first neuro-synaptic core and enable a third circuitry of the first neuro-synaptic core responsive to a first value specified by the configuration parameter; and disable the third circuitry and enable the second circuitry responsive to a second value specified configuration parameter.

21. A system comprising:
a memory; and
a processor comprising a plurality of first neuro-synaptic cores;
wherein the processor is to:
set one or more configuration parameters, a configuration parameter to specify a first value or a second value;
cause the plurality of first neuro-synaptic cores to be configured as neuron cores responsive to the first value specified by the one or more configuration parameters; and
cause the plurality of first neuro-synaptic cores to be configured as synapse cores responsive to a second value specified by the one or more configuration parameters, wherein configuration of a neuro-synaptic core as a neuron core comprises enabling neuron processing circuitry of the neuro-synaptic core, the neuron processing circuitry to update neuron states, and wherein configuring a neuro-synaptic core as a synapse core comprises disabling the neuron processing circuitry of the neuro-synaptic core.

22. The system of claim 21, the processor further comprising a plurality of second neuro-synaptic cores, the processor to:
cause the plurality of second neuro-synaptic cores to be configured as synapse cores responsive to the first value specified by the one or more configuration parameters; and
cause the plurality of second neuro-synaptic cores to be configured as neuron cores responsive to the second value specified by the one or more configuration parameters.

23. The system of claim 21, further comprising a network interface to transmit results generated by a neural network comprising the plurality of first neuro-synaptic cores.

24. The system of claim 21, further comprising a display to display results generated by a neural network comprising the plurality of first neuro-synaptic cores.

25. The system of claim 21, further comprising a cellular communication interface.

26. The system of claim 21, further comprising a battery communicatively coupled to the processor, a display communicatively coupled to the processor, or a network interface communicatively coupled to the processor.

* * * * *